US010559091B2

(12) United States Patent
Ikeda

(10) Patent No.: US 10,559,091 B2
(45) Date of Patent: Feb. 11, 2020

(54) OBJECT COUNTING DEVICE, OBJECT COUNTING METHOD, OBJECT COUNTING PROGRAM, AND OBJECT COUNTING SYSTEM

(71) Applicant: NEC CORPORATION, Tokyo (JP)

(72) Inventor: Hiroo Ikeda, Tokyo (JP)

(73) Assignee: NEC CORPORATION, Minato-ku, Tokyo (JP)

(*) Notice: Subject to any disclaimer, the term of this patent is extended or adjusted under 35 U.S.C. 154(b) by 119 days.

(21) Appl. No.: 15/758,964

(22) PCT Filed: Jul. 8, 2016

(86) PCT No.: PCT/JP2016/003260
§ 371 (c)(1),
(2) Date: Mar. 9, 2018

(87) PCT Pub. No.: WO2017/043002
PCT Pub. Date: Mar. 16, 2017

(65) Prior Publication Data
US 2018/0286077 A1 Oct. 4, 2018

(30) Foreign Application Priority Data
Sep. 11, 2015 (JP) ................. 2015-179818

(51) Int. Cl.
G06T 7/77 (2017.01)
G06M 3/00 (2006.01)
(52) U.S. Cl.
CPC ............... G06T 7/77 (2017.01); G06M 3/00 (2013.01); G06T 2207/30242 (2013.01)
(58) Field of Classification Search
CPC ........... G06K 9/00771; G06K 9/00778; G06K 9/6282; G06K 9/00268; G06K 9/00288;
(Continued)

(56) References Cited

U.S. PATENT DOCUMENTS 8,472,715 B2 * 6/2013 Yokomitsu ............. B61L 23/00
382/103
9,619,729 B2 * 4/2017 Pham ................. G06K 9/00771
(Continued)

FOREIGN PATENT DOCUMENTS

JP 2005-216217 A 8/2005
JP 2007-257316 A 10/2007
(Continued)

OTHER PUBLICATIONS

International Search Report for PCT/JP2016/003260, dated Oct. 11, 2016 (PCT/ISA/210).

Primary Examiner — Michael S Osinski
(74) Attorney, Agent, or Firm — Sughrue Mion, PLLC

(57) ABSTRACT

An object counting system includes an acquisition means for acquiring information of an estimation area which is a partial area of an image with which partial area a predetermined condition related to objects to be counted shown in the image are associated, the estimation area being a unit of area for estimating the number of the objects to be counted, a setting means for setting the estimation area in the image in such a manner that the estimation area indicated by the acquired information of the estimation area includes the objects to be counted which are not included in the objects to be counted in a different estimation area, and which satisfy the predetermined condition, an estimation means for estimating, in each estimation area, the number of the objects to be counted shown in the estimation area set in the image, and a computation means for computing a density of the objects to be counted in an area where predetermined areas in the estimation area are overlapped using the number of the objects to be counted that has been estimated in each estimation area.

8 Claims, 20 Drawing Sheets

(58) Field of Classification Search
CPC ........... G06K 9/00275; G06K 9/00362; G06K 9/3233; G06K 9/6226; G06T 7/77; G06T 7/248; G06T 2207/30242; G06T 2207/30232; G06T 2207/20021; G06T 2207/20072; G06T 2207/20076; G06T 2207/30196; G06M 3/00
See application file for complete search history.

(56) References Cited

U.S. PATENT DOCUMENTS

| | | | | |
|---|---|---|---|---|
| 10,289,884 B2* | 5/2019 | Pham | ................. | G06K 9/00 |
| 10,304,232 B2* | 5/2019 | Janas | ................. | G06T 13/80 |
| 2005/0105770 A1* | 5/2005 | Sumitomo | ......... | G06K 9/00362 |
| | | | | 382/103 |
| 2010/0322516 A1* | 12/2010 | Xu | ................. | G06K 9/00778 |
| | | | | 382/173 |
| 2013/0113934 A1* | 5/2013 | Hotta | ................. | G06K 9/00778 |
| | | | | 348/143 |
| 2014/0022394 A1* | 1/2014 | Bae | ................. | G06K 9/00771 |
| | | | | 348/169 |
| 2014/0226855 A1* | 8/2014 | Savvides | ............ | G06K 9/00771 |
| | | | | 382/103 |
| 2015/0242709 A1* | 8/2015 | Pham | ................. | G06K 9/6226 |
| | | | | 382/160 |
| 2016/0140414 A1* | 5/2016 | Pham | ................. | G06K 9/00771 |
| | | | | 382/165 |
| 2016/0343152 A1* | 11/2016 | Hay | ................. | G06T 7/337 |
| 2017/0053172 A1* | 2/2017 | Nakasu | ............. | G06K 9/00778 |
| 2017/0061644 A1* | 3/2017 | Pham | ................. | G06K 9/00 |
| 2018/0150684 A1* | 5/2018 | Wang | ................. | G06T 7/11 |
| 2018/0293775 A1* | 10/2018 | Janas | ................. | G06T 13/80 |
| 2019/0051171 A1* | 2/2019 | Malkes | ............ | G08G 1/096725 |

FOREIGN PATENT DOCUMENTS

| | | |
|---|---|---|
| JP | 2009-223693 A | 10/2009 |
| JP | 2010-28606 A | 2/2010 |
| JP | 2015-121905 A | 7/2015 |

* cited by examiner

OBJECT COUNTING DEVICE, OBJECT COUNTING METHOD, OBJECT COUNTING PROGRAM, AND OBJECT COUNTING SYSTEM

CROSS REFERENCE TO RELATED APPLICATIONS

This application is a National Stage of International Application No. PCT/JP2016/003260 filed Jul. 8, 2016, claiming priority based on Japanese Patent Application No. 2015-179818, filed Sep. 11, 2015.

TECHNICAL FIELD

The present invention relates to an object counting device, an object counting method, an object counting program, and an object counting system, and more particularly relates to an object counting device, an object counting method, an object counting program, and an object counting system that count persons or objects appearing in an image.

BACKGROUND ART

An object counting device that counts persons and objects appearing in an image is disclosed in PTL 1. PTL 1 discloses an imaging device used for counting persons appearing in an image, and a control method for the imaging device.

The imaging device disclosed in PTL 1 detects the faces of persons existing in an acquired image and counts the detected faces. However, there can be a case in which persons overlap each other and appear in an image when, for example, the place is crowded. The imaging device disclosed in PTL 1 has a problem that it is difficult to correctly count persons (objects) in an image in which persons (objects) overlap each other.

There is a technique that solves the above problem and takes the use for a local image region into consideration, for estimating the number of persons by learning an image in which persons overlap each other together with a label of the number of persons. When the number of persons appearing in an image is estimated using this technique, the object counting device sets a plurality of windows for estimation corresponding to local regions (hereinafter referred to as an estimation window) in the image based on the size of, for example, a head to be counted in the image. The object counting device estimates the number of persons in each set estimation window using the above technique.

FIG. 22 is an explanatory diagram showing an example of a method for counting persons appearing in an image using estimation windows. The object counting device sums the number of persons estimated in each estimation window, and the number of persons appearing in the entire image is thereby estimated.

CITATION LIST

Patent Literature

PTL 1: Japanese Patent Application Laid-Open No. 2010-028606
PTL 2: Japanese Patent Application Laid-Open No. 2005-216217
PTL 3: Japanese Patent Application Laid-Open No. 2009-223693

SUMMARY OF INVENTION

Technical Problem

A problem of the technique for counting using the above estimation window is that the number of persons appearing in an entire screen can be erroneously estimated according to an arrangement method of estimation windows.

As shown in FIG. 22, each estimation window is arranged so as not to overlap any other estimation window. The size of the head of the person C shown in FIG. 22 is much smaller than the size of the learning target head set to the estimation window 1. Thus, the object counting device cannot count the person C in the counting processing in the estimation window 1. The estimated number of persons by the counting processing in the estimation window 1 is two.

Each estimation window shown in FIG. 22 is arranged so as not to overlap any other estimation window. Thus, the object counting device cannot count the person C in the counting processing in the estimation windows other than the estimation window 1, and the final total estimated number of persons is two. That is, when the estimation window shown in FIG. 22 is used, the person C is not counted.

FIG. 23 is an explanatory diagram showing another example of a method for counting persons appearing in an image using estimation windows. The size of the head of the person C shown in FIG. 23 is substantially equal to the size of the learning target head set to the estimation window 2. Thus, the object counting device can count the person C in the counting processing in the estimation window 2. The estimated number of persons in the counting processing in the estimation window 2 is one, and the final total estimated number of persons is three.

As described above, in order to count the person C, it is required to arrange an estimation window having an appropriate size, such as the estimation window 2 shown in FIG. 23, so as to overlap the estimation window 1. However, when the estimation window is arranged so as to overlap another estimation window as shown in FIG. 23, another problem can arise.

FIG. 24 is an explanatory diagram showing another example of a method for counting persons appearing in an image using estimation windows. The estimation windows shown in FIG. 24 are arranged so as to overlap each other without any particular consideration. When the estimation windows shown in FIG. 24 are used, the object counting device counts the person E in the counting processing in both of the estimation window 3 and the estimation window 4, that is, the person E is doubly counted.

The estimated number of persons in the counting processing in the estimation window 3 shown in FIG. 24 is two, and the estimated number of persons in the counting processing in the estimation window 4 is one. The final total estimated number of persons is three, and the number of persons is erroneously estimated.

If the estimation windows are not appropriately arranged because of the above reasons, a problem that persons are not counted or doubly counted arises, and the number of persons can be erroneously estimated. In order to prevent erroneous estimation of the number of persons, it is required to appropriately arrange estimation windows and appropriately integrate the number of persons counted in each estimation window.

PTL 2 discloses a person counting device that prevents double counting and counts persons with high precision when a person whose body is partly hidden by another person existing in front of an image. However, the person counting device disclosed in PTL 2 sets a definition frame including one person and counts the number of set definition frames as the number of persons appearing in the image. That is, in the counting method disclosed in PTL 2, the counting efficiency is low with respect to an image in which many persons appear.

In addition, the image to be processed by the person counting device disclosed in PTL 2 is limited to an image showing a place set so that each person can be easily distinguished, and a person counting device that can process any image is required.

PTL 3 discloses a method for computing the number of persons in an image by computing the area of pixels representing a human body in the image and dividing the computed area by the preset number of pixels per person. However, the method for computing the number of persons in a region where the region corresponding to the computed area is doubled is not particularly taken into consideration, and a device that appropriately integrates the number of persons estimated in each estimation window when the estimation windows overlap each other is required.

Thus, a purpose of the present invention is to provide an object counting device, an object counting method, an object counting program, and an object counting system that can more accurately count objects in an image.

Solution to Problem

An object counting device according to the present invention includes an acquisition means which acquires information of an estimation area which is a partial area of an image with which partial area a predetermined condition related to objects to be counted shown in the image are associated, the estimation area being a unit of area for estimating the number of the objects to be counted, and a setting means which sets the estimation area in the image in such a manner that the estimation area indicated by the acquired information of the estimation area includes the objects to be counted which are not included in the objects to be counted in a different estimation area, and which satisfy the predetermined condition.

An object counting method according to the present invention includes acquiring information of an estimation area which is a partial area of an image with which partial area a predetermined condition related to objects to be counted shown in the image are associated, the estimation area being a unit of area for estimating the number of the objects to be counted, and setting the estimation area in the image in such a manner that the estimation area indicated by the acquired information of the estimation area includes the objects to be counted which are not included in the objects to be counted in a different estimation area, and which satisfy the predetermined condition.

An object counting program according to the present invention causes a computer to perform acquisition processing for acquiring information of an estimation area which is a partial area of an image with which partial area a predetermined condition related to objects to be counted shown in the image are associated, the estimation area being a unit of area for estimating the number of the objects to be counted, and setting processing for setting the estimation area in the image in such a manner that the estimation area indicated by the acquired information of the estimation area includes the objects to be counted which are not included in the objects to be counted in a different estimation area, and which satisfy the predetermined condition.

An object counting device according to the present invention includes an estimation means which estimates, in each estimation area, the number of the objects to be counted shown in an estimation area set in an image where is a partial area of the image, and is a unit of area in which the number of the objects to be counted is estimated, and a computation means which computes a density of the objects to be counted in an area where predetermined areas in the estimation area are overlapped using the number of the objects to be counted that has been estimated in each estimation area.

An object counting method according to the present invention includes estimating, in each estimation area, the number of the objects to be counted shown in an estimation area set in an image where is a partial area of the image, and is a unit of area in which the number of the objects to be counted is estimated, and computing a density of the objects to be counted in an area where predetermined areas in the estimation area are overlapped using the number of the objects to be counted that has been estimated in each estimation area.

An object counting program according to the present invention causes a computer to perform estimation processing for estimating, in each estimation area, the number of the objects to be counted shown in an estimation area set in an image where is a partial area of the image, and is a unit of area in which the number of the objects to be counted is estimated, and computation processing for computing a density of the objects to be counted in an area where predetermined areas in the estimation area are overlapped using the number of the objects to be counted that has been estimated in each estimation area.

An object counting system according to the present invention includes an acquisition means which acquires information of an estimation area which is a partial area of an image with which partial area a predetermined condition related to objects to be counted shown in the image are associated, the estimation area being a unit of area for estimating the number of the objects to be counted, a setting means which sets the estimation area in the image in such a manner that the estimation area indicated by the acquired information of the estimation area includes the objects to be counted which are not included in the objects to be counted in a different estimation area, and which satisfy the predetermined condition, an estimation means which estimates, in each estimation area, the number of the objects to be counted shown in the estimation area set in the image, and a computation means which computes a density of the objects to be counted in an area where predetermined areas in the estimation area are overlapped using the number of the objects to be counted that has been estimated in each estimation area.

Advantageous Effects of Invention

According to the present invention, it is possible to count objects in an image more accurately.

DESCRIPTION OF EMBODIMENTS

[Description of Configuration]

Figure 1:
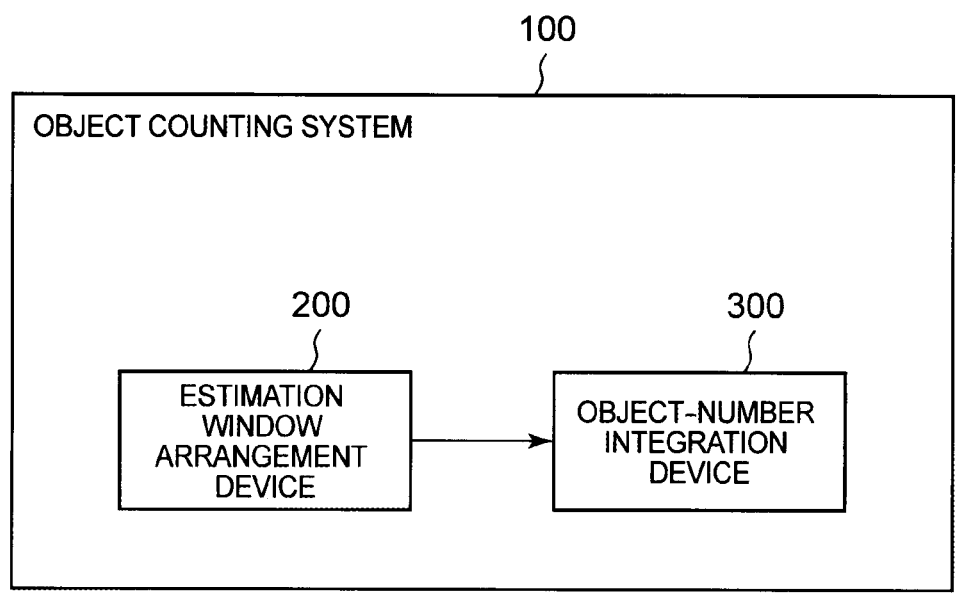
FIG. 1 is a block diagram showing a configuration example of an object counting system according to the present invention.

Hereinafter, an exemplary embodiment of the present invention will be described with reference to the drawings. FIG. 1 is a block diagram showing a configuration example of an object counting system according to the present invention.

As shown in FIG. 1, an object counting system 100 includes an estimation window arrangement device 200 and an object-number integration device 300. The estimation window arrangement device 200 generates optimal estimation windows for more accurately counting objects in an image and appropriately arranges the estimation windows generated in the target image. The object-number integration device 300 estimates the number of persons using appropriately arranged estimation windows and counts objects in the image by appropriately integrating the number of persons estimated in each estimation window.

Note that, the object counting system 100 may include either the estimation window arrangement device 200 or the object-number integration device 300. In addition, the estimation window arrangement device 200 and the object-number integration device 300 each can be used individually.

Figure 2:
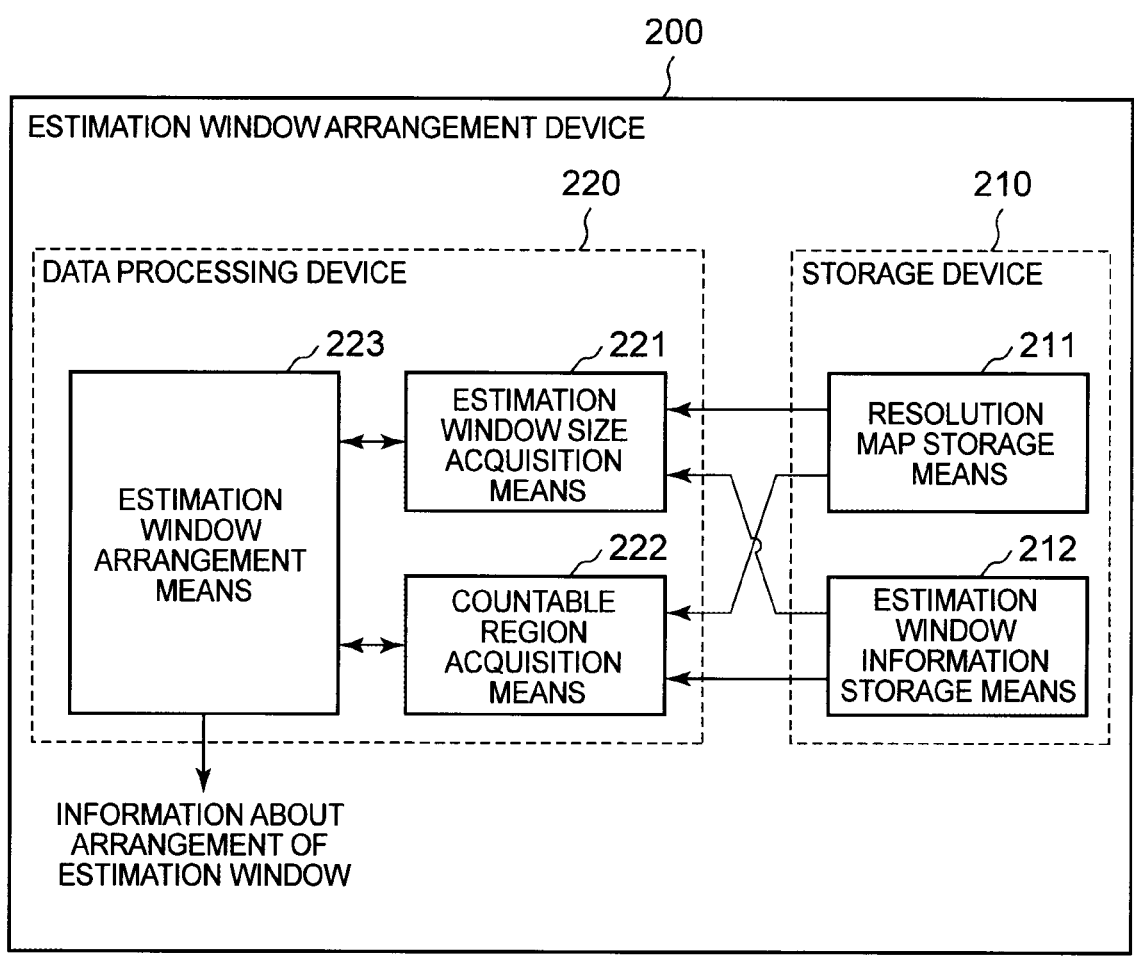
FIG. 2 is a block diagram showing a configuration example of an estimation window arrangement device 200.

FIG. 2 is a block diagram showing a configuration example of the estimation window arrangement device 200. As shown in FIG. 2, the estimation window arrangement device 200 includes a storage device 210 and a data processing device 220. The storage device 210 stores information used to generate an optimal estimation window. The operation of the data processing device 220 is controlled, for example, by executing a program by a central processing unit (CPU).

As shown in FIG. 2, the storage device 210 includes a resolution map storage means 211 and an estimation window information storage means 212.

The resolution map storage means 211 has a function of mapping and storing the resolution of a rectangle indicating a counting target object for an image position in an image. In the present exemplary embodiment, the term "mapping" means associating the image position with the resolution of a rectangle indicating the counting target object.

The counting target object is an object in the image to be counted by the object-number integration device 300. The resolution is represented by, for example, values of a width pixel and a height pixel.

The resolution map storage means 211 further has a function of mapping and storing the relative position of a rectangle indicating a counting target object for the image position in the image. The relative position is a position based on the rectangle indicating the counting target object, and is associated with the image position. The relative position has a predetermined relative relation with the image position.

Figure 3:
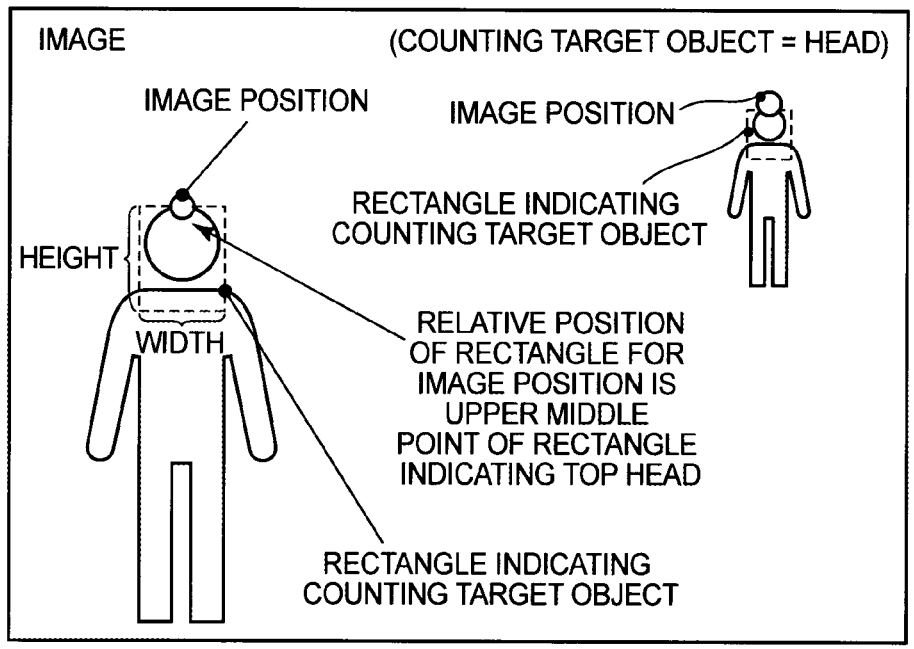
FIG. 3 is an explanatory diagram showing the relation in information stored in a resolution map storage means 211.

FIG. 3 is an explanatory diagram showing the relation in information stored in the resolution map storage means 211. The information stored in the resolution map storage means 211 indicates the expression way of the counting target object at an arbitrary image position. That is, as shown in FIG. 3, by using the resolution of the mapped rectangle stored in the resolution map storage means 211, the data processing device 220 can draw a rectangle indicating the counting target object in the image once the image position is determined.

In the example shown in FIG. 3, the head of a person is used as the counting target object. The counting target object may be a whole person, or a whole or a part of an object such as a car or an animal. The counting target object may be any object that is countable. In the present exemplary embodiment, the head of a person is used as the counting target object.

In the example shown in FIG. 3, the relative position of the rectangle indicating the counting target object for the image position is the upper middle point of the rectangle indicating the top of the head. The relative position of the rectangle may be the center of the rectangle indicating the center of the head. The relative position of the rectangle may be any position having a predetermined relative relation with the image position.

In the example shown in FIG. 3, the resolution of the rectangle is used as the resolution. The resolution map storage means 211 may store the resolution (size) of an arbitrary shape instead of the resolution of the rectangle.

The resolution of the rectangle for the image position is computed from, for example, the actual size of the counting target object and the camera parameters indicating the posture and position of the camera. When the resolution of the rectangle is computed from the camera parameters, the resolution map storage means 211 stores the computed resolution. Alternatively, the resolution of the rectangle for the image position may be sequentially computed after the image position is determined.

When a part of the information stored in the resolution map storage means 211 is insufficient, for example, the user may cause display means (not shown) to display the counting target object in the image, and manually input the information about the rectangle to the resolution map storage means 211.

Alternatively, the user may cause the display means (not shown) to display the counting target object in the image, manually input the information about the rectangles at several image positions to the resolution map storage means 211, and derive the information about the rectangle at another image position by interpolation processing using the information input to the resolution map storage means 211.

The above interpolation processing is for interpolating the resolution of a rectangle at an image position that has not been input using the resolution of the rectangle at the input image position. For example, if the resolutions of the rectangles at the image positions at the four corners of the image are manually input and the linear interpolation processing or the like is performed on the basis of the input information, the resolution of a rectangle at another image position is interpolated. Note that, the interpolation processing may be any processing other than the linear interpolation processing.

The estimation window information storage means 212 has a function of storing information about the estimation window used by an estimator learned by the object-number integration device 300 to estimate the number of objects.

The estimation window information storage means 212 stores the ratio between the size of the estimation window and the rectangular size of the counting target object which is a reference for estimation (hereinafter, referred to as a reference rectangular size), and the aspect ratio between the width and height of the estimation window.

The estimation window information storage means 212 also stores a range of ratios between the size of the counting target object that can be counted using the estimation window and the reference rectangular size, corresponding to the range of sizes of the counting target object. The information stored in the estimation window information storage means 212 is, for example, information determined when the object-number integration device 300 learns the estimator.

Figure 4:
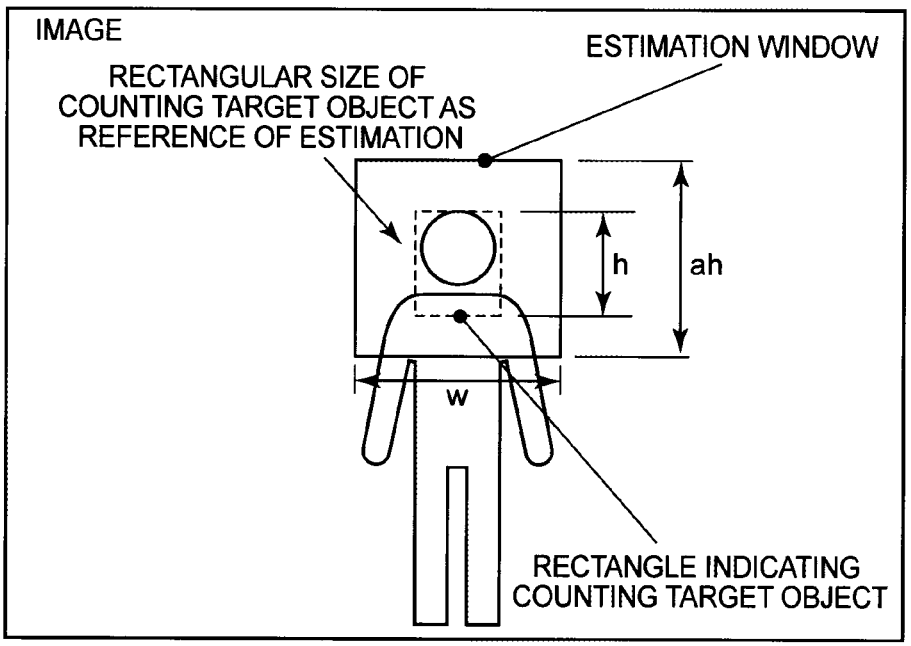
FIG. 4 is an explanatory diagram showing the relation in information stored in an estimation window information storage means 212.

FIG. 4 is an explanatory diagram showing the relation in information stored in the estimation window information storage means 212. The estimation window shown in FIG. 4 is drawn using the aspect ratio between the width and height of the estimation window and the ratio between the size of the estimation window and the reference rectangular size stored in the estimation window information storage means 212.

For example, as shown in FIG. 4, the rectangular size of the counting target object as the reference for estimation, that is, the height of the reference rectangular size is "h", and the height of the estimation window is "a×h". That is, FIG. 4 shows that an estimation window having a height "a" times the height of the reference rectangular size is required for the estimation based on the counting target object the reference rectangular size of which is "h".

Specifically, the ratio of the size of the estimation window to the reference rectangular size in the example shown in FIG. 4 is "a". The estimation window information storage means 212 stores the ratio of the size of the estimation window to the reference rectangular size.

Also, as shown in FIG. 4, the width of the estimation window is "w", and the aspect ratio between the width and height of the estimation window is "w:a×h". The estimation window information storage means 212 stores the aspect ratio of the width and height of the estimation window to the reference rectangular size.

Figure 5:
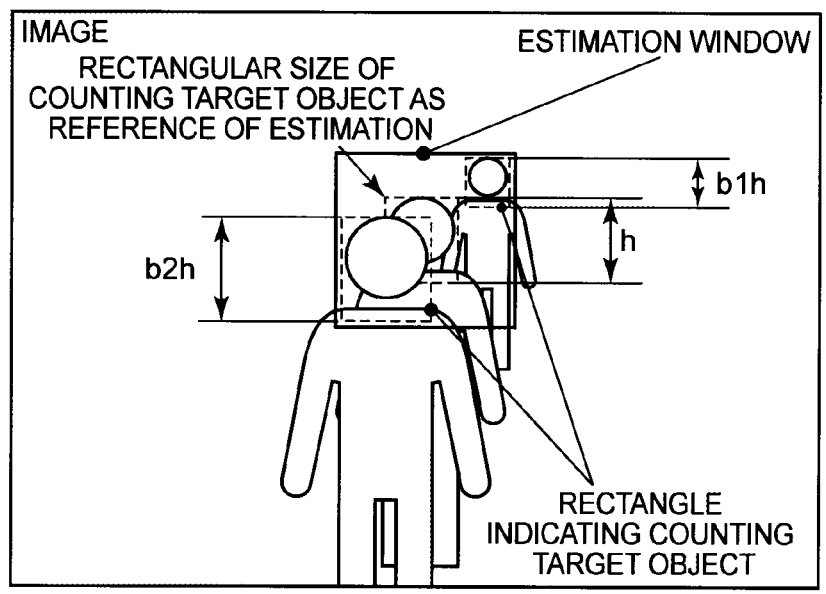
FIG. 5 is an explanatory diagram showing the different relation in information stored in the estimation window information storage means 212.

FIG. 5 is an explanatory diagram showing the different relation in information stored in the estimation window information storage means 212. FIG. 5 shows the relation between the size of the counting target object that can be counted using the estimation window and the reference rectangular size.

FIG. 5 shows a reference rectangular size having a height h, a rectangle indicating a counting target object having a height b1×h, and a rectangle indicating a counting target object having a height b2×h. The rectangle having the height b1×h is the smallest rectangle that can be counted using the estimation window shown in FIG. 5. The rectangle having the height b2×h is the largest rectangle that can be counted using the estimation window shown in FIG. 5.

That is, if the estimation windows shown in FIG. 5 are used, the number of counting target objects indicated by rectangles having the sizes b1 to b2 times the reference rectangular size is estimated. The estimation window information storage means 212 stores the information of b1 to b2 as a ratio range. The range of ratios stored in the estimation window information storage means 212 is a range expressed by the ratio of the range of rectangular sizes that can be counted using the estimation window to the reference rectangular size.

By using the information stored in the estimation window information storage means 212 as described above, the size and shape of the estimation window corresponding to the rectangle of the counting target object as the reference for estimation are obtained. Furthermore, the range of sizes of the rectangle indicating the counting target object that can be counted using the obtained estimation window is obtained.

As shown in FIG. 2, the data processing device 220 includes an estimation window size acquisition means 221, a countable region acquisition means 222, and an estimation window arrangement means 223.

The estimation window size acquisition means 221 has a function of acquiring, on the basis of a given image position in the image, the size and shape of an effective estimation window for the image position. The estimation window size acquisition means 221 acquires the information about the estimation window using the information stored in the resolution map storage means 211 and the information stored in the estimation window information storage means 212.

Specifically, the estimation window size acquisition means 221 refers to the position, which corresponds to the given image position in the image, in the resolution map stored in the resolution map storage means 211, and acquires the resolution of the rectangle indicating the counting target object for the image position. The estimation window size acquisition means 221 sets the acquired resolution to the reference rectangular size.

Next, the estimation window size acquisition means 221 acquires the ratio, which corresponds to the acquired reference rectangular size, between the size of the estimation window and the rectangular size of the counting target object from the estimation window information storage means 212. The rectangular size of the counting target object is equivalent to the reference rectangular size. The estimation window size acquisition means 221 computes the size of the estimation window using the acquired ratio, and acquires the size of the effective estimation window for the given image position.

The estimation window size acquisition means 221 further acquires the aspect ratio of the estimation window corresponding to the computed size of the estimation window from the estimation window information storage means 212. The estimation window size acquisition means 221 determines the shape of the estimation window using the computed size of the estimation window and the acquired aspect ratio, and acquires the shape of the effective estimation window for the given image position.

The countable region acquisition means 222 has a function of acquiring a region in which the number of counting target objects can be estimated using the estimation window based on the given image position in the image. The countable region acquisition means 222 acquires the region in which the number of counting target objects can be estimated using the information stored in the resolution map storage means 211 and the information stored in the estimation window information storage means 212.

Specifically, the countable region acquisition means 222 refers to the position, which corresponds to the given image position in the image, in the resolution map stored in the resolution map storage means 211, and acquires the resolution of the rectangle indicating the counting target object for the image position.

Figure 6:
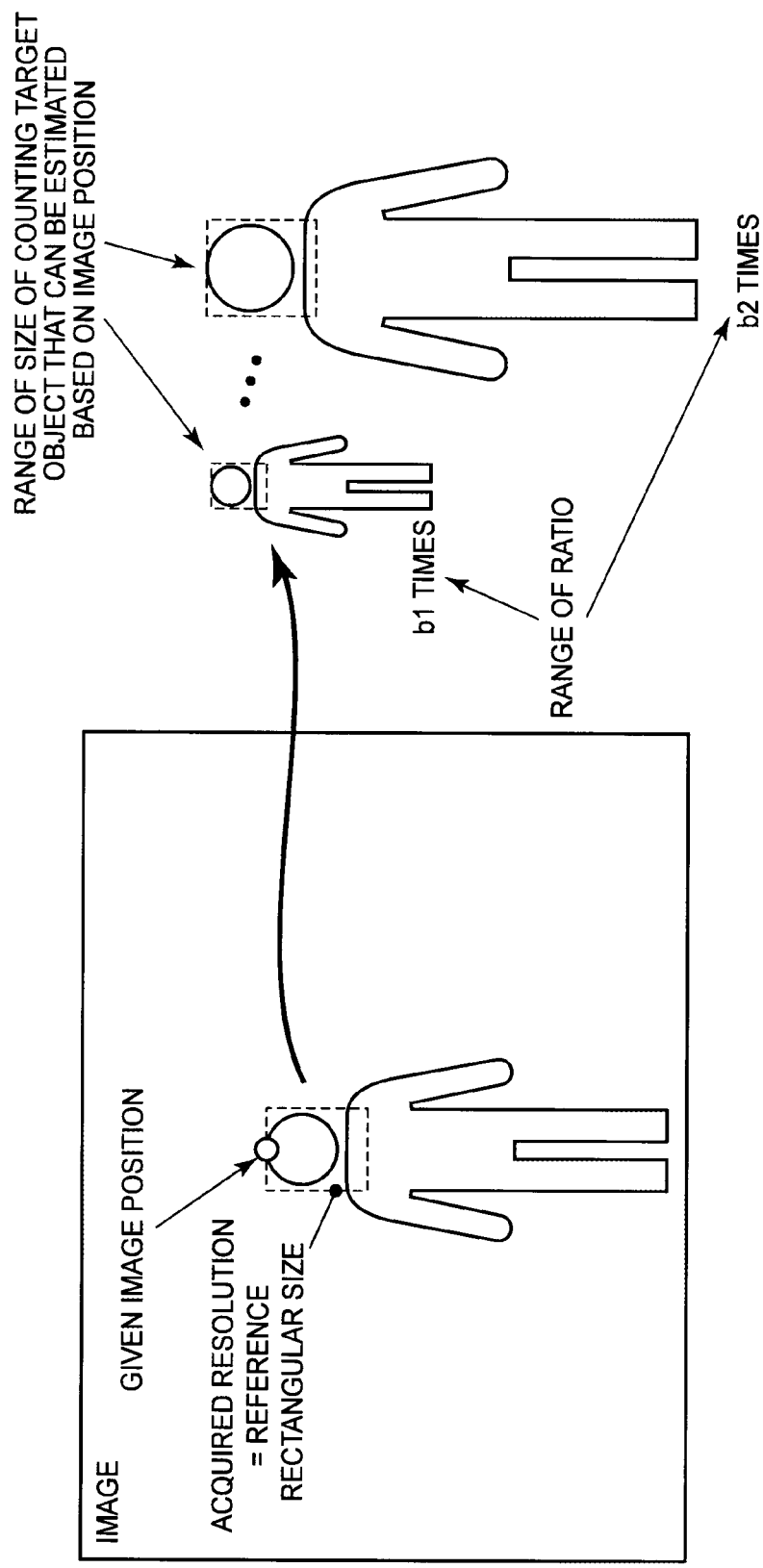
FIG. 6 is an explanatory diagram showing an example of computation processing of a range of sizes of a counting target object that can be estimated based on an image position by a countable region acquisition means 222.

FIG. 6 is an explanatory diagram showing an example of computation processing of a range of sizes of a counting target object that can be estimated based on an image position by the countable region acquisition means 222. As shown in FIG. 6, the countable region acquisition means 222 sets the acquired resolution to the reference rectangular size.

Next, the countable region acquisition means 222 acquires, from the estimation window information storage means 212, the range of ratios of the rectangular size which corresponds to the obtained reference rectangular size and can be counted using the estimation window based on the image position. The countable region acquisition means 222 computes the range of sizes of the counting target object that can be estimated based on the image position using the acquired range of ratios.

FIG. 6 shows that the range of sizes of the counting target object which can be estimated based on the image position is from b1 times the size of the reference rectangular size to b2 times the size of the reference rectangular size.

Figure 7:
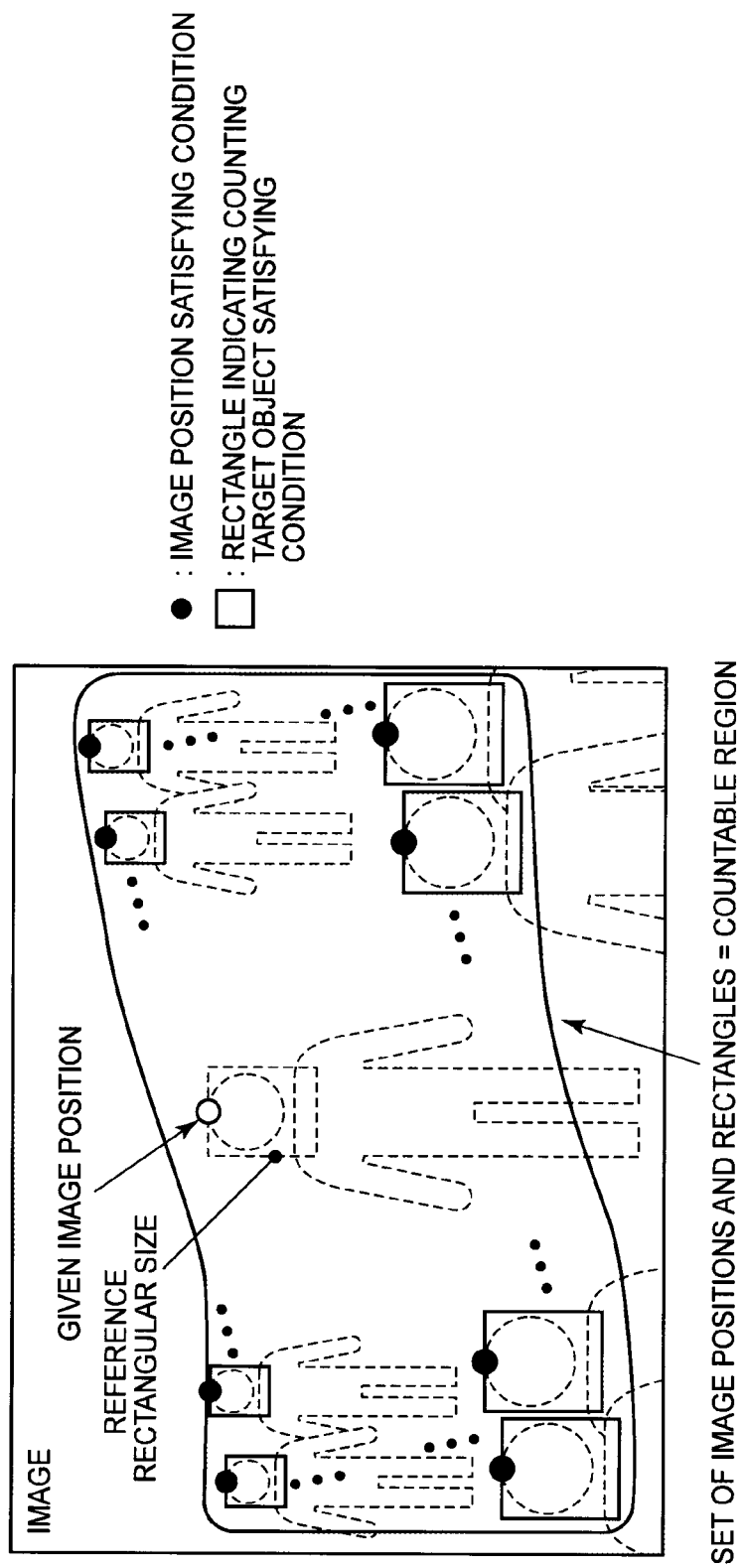
FIG. 7 is an explanatory diagram showing an example of acquisition processing of a region in which the number of objects can be estimated using an estimation window based on the image position by the countable region acquisition means 222.

FIG. 7 is an explanatory diagram showing an example of acquisition processing of a region in which the number of objects can be estimated using an estimation window based on the image position by the countable region acquisition means 222. After computing the range of sizes of the counting target object that can be estimated, as shown in FIG. 7, the countable region acquisition means 222 extracts all the image positions, in the image, satisfying the condition and corresponding to the given image position, and all the rectangles indicating the counting target objects, in the image, satisfying the condition. The countable region acquisition means 222 indicates the extracted image positions and rectangles in the image.

The condition used by the countable region acquisition means 222 is that the size of the rectangle indicating the counting target object is within the computed range of sizes of the counting target object. The countable region acquisition means 222 confirms whether the resolution of each mapped rectangle stored in the resolution map storage means 211 satisfies the condition. The countable region acquisition means 222 extracts the rectangles and image positions that correspond to the resolution satisfying the condition.

The countable region acquisition means 222 acquires a region including a set of image positions and rectangles indicated in the image as a region that the number of objects can be estimated using the estimation window based on the given image position (hereinafter, referred to as a countable region).

The estimation window arrangement means 223 has a function of arranging estimation windows so that the number is appropriately estimated in the entire region or a partial region of the image. In order to estimate the number in each region, the estimation window arrangement means 223 appropriately arranges an estimation window so as to extensively include the countable region from which the object-number estimatable region having the arranged estimation window is removed.

The reason for arranging the estimation window so as to extensively include the countable region is to reduce the number of estimation windows to be arranged as much as possible. The estimation processing is performed more quickly as the number of estimation windows to be arranged is smaller.

When arranging estimation windows, the estimation window arrangement means 223 uses an effective estimation window, for the image position, acquired from the estimation window size acquisition means 221. Furthermore, when arranging estimation windows, the estimation window arrangement means 223 uses the countable region based on the image position and acquired from the countable region acquisition means 222, and the object-number estimatable region having the arranged estimation window. Note that, the object-number estimatable region having the arranged estimation window is constituted by a set of rectangles indicating the counting target objects.

Figure 8:
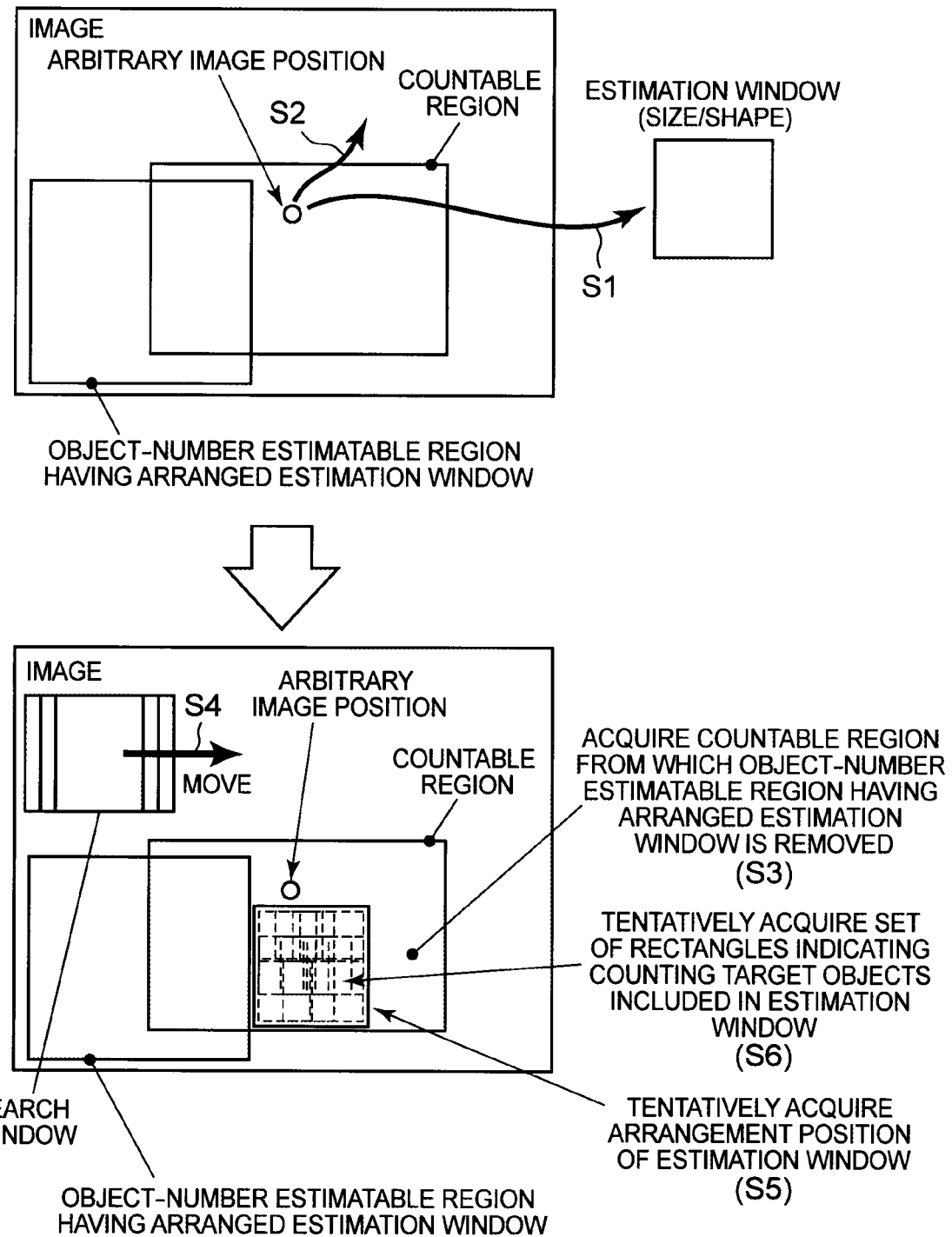
FIG. 8 is an explanatory diagram showing an example of tentative acquisition processing of an arrangement position of an estimation window by an estimation window arrangement means 223.

FIG. 8 is an explanatory diagram showing an example of tentative acquisition processing of an arrangement position of an estimation window by the estimation window arrangement means 223. Specifically, as shown in FIG. 8, the estimation window arrangement means 223 acquires the size and shape of the effective estimation window for an arbitrary image position from the estimation window size acquisition means 221 (step S1). Then, the estimation window arrangement means 223 acquires a countable region based on the same arbitrary image position as that in step S1 from the countable region acquisition means 222 (step S2).

Next, in order to prevent double counting, the estimation window arrangement means 223 removes, from the countable region acquired in step S2, the object-number estimatable region having the arranged estimation window (step S3). Hereinafter, the remaining countable region from which the object-number estimatable region having the arranged estimation window is removed is referred to as a region A.

Figure 9:
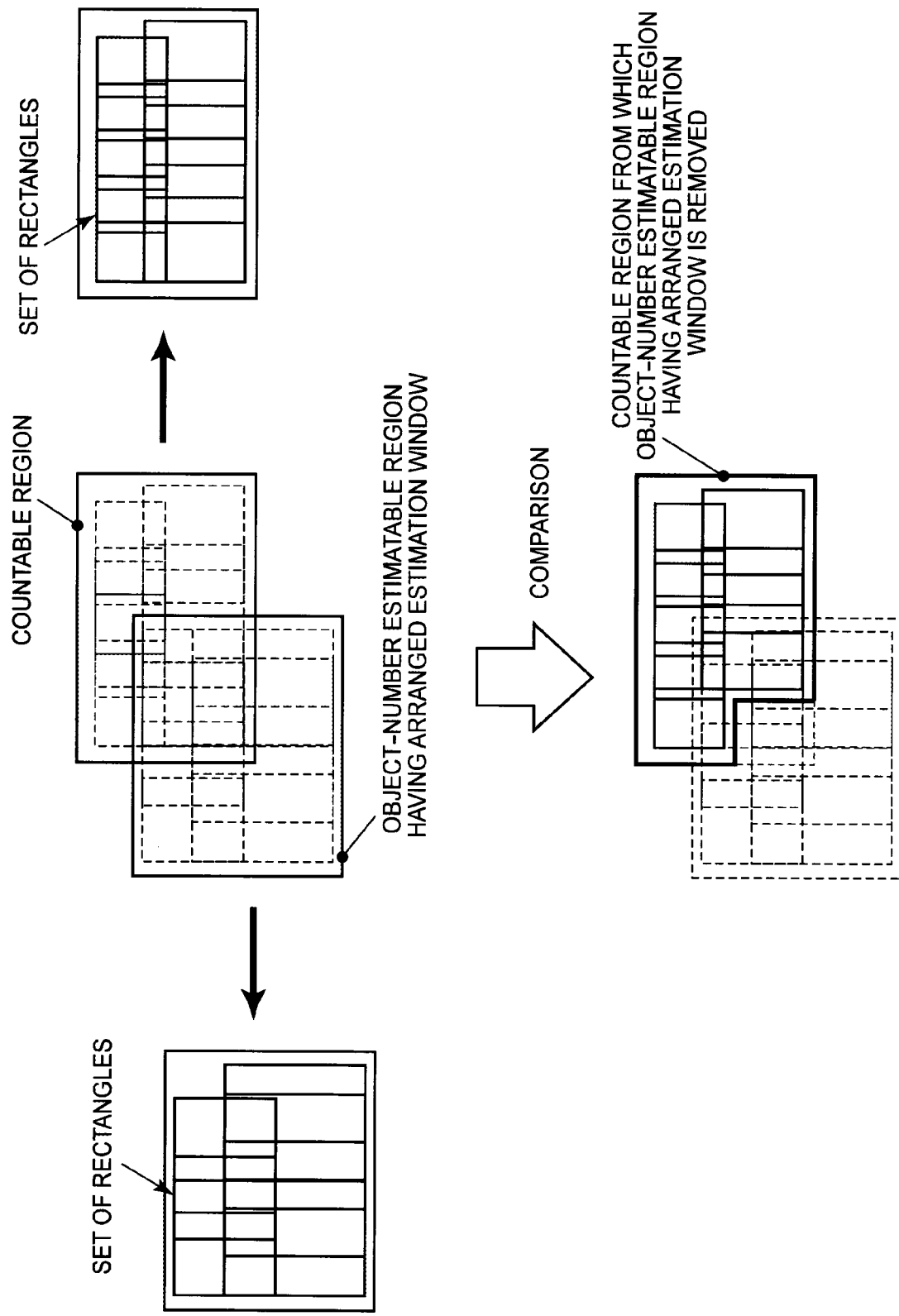
FIG. 9 is an explanatory diagram showing a countable region from which an object-number estimatable region having an arranged estimation window is removed.

FIG. 9 is an explanatory diagram showing a countable region from which an object-number estimatable region having an arranged estimation window is removed. As shown in FIG. 9, the region A, which is the countable region from which the object-number estimatable region having the arranged estimation window is removed, is constituted by a set of rectangles.

The set of rectangles constituting the region A is a set of rectangles constituting the remaining countable region from which the rectangles included in both sets of rectangles constituting the countable region and of rectangles constituting the object-number estimatable region having the arranged estimation window are removed.

Next, the estimation window arrangement means 223 moves the estimation window obtained in step S1 within the screen (step S4). In step S4, the estimation window arrangement means 223 searches for an arrangement position of the estimation window such that the estimation window extensively includes the region A. The estimation window arrangement means 223 tentatively acquires the searched arrangement position (step S5).

Note that, the conditions that the estimation window arrangement means 223 follows when searching for the arrangement position of the estimation window may include, in addition to "extensively including the region A", "close to the arranged estimation window", and "located at a lower position of the screen".

Furthermore, conditions that "extensively including rectangles of a set of rectangles indicating the counting target objects and constituting the countable region" and "including a countable region around the arranged estimation window" may be included. Conditions other than the above conditions may be included.

Next, the estimation window arrangement means 223 tentatively acquires a set of rectangles indicating the counting target objects and constituting the region A included in the estimation window, together with the arrangement position of the estimation window (step S6).

As shown in FIG. 8, the set of rectangles indicating the counting target objects and constituting the region A included in the estimation window is basically a set of rectangles that are completely included in the estimation window. If it is possible to estimate the number of objects from a rectangle included at a predetermined ratio in the estimation window, the set of rectangles indicating the counting target objects and constituting the region A included in the estimation window is a set of rectangles that included at a predetermined ration or more in the estimation window. The predetermined ratio is determined when the estimator is generated by learning.

The estimation window arrangement means 223 performs the processing in steps S1 to S6 to other arbitrary image positions. The estimation window arrangement means 223 determines the arrangement position that satisfies the condition most appropriately from the tentatively acquired arrangement positions of the estimation window as the arrangement position of the estimation window. The estimation window arrangement means 223 registers, as information about the arrangement of the arranged estimation window, the position, size, and shape of the estimation window the arrangement position of which has been determined.

The estimation window arrangement means 223 further registers the region constituted by the tentatively acquired set of rectangles indicating the counting target objects and corresponding to the determined arrangement position as an object-number estimatable region having the arranged estimation window.

The estimation window arrangement means 223 associates the registered object-number estimatable region with the simultaneously registered information about the arrangement of the estimation window. By associating the region with the arranged estimation window, the object-number estimatable region using each estimation window can be easily distinguished.

The estimation window arrangement means 223 repeats the above processing until the termination condition is satisfied, and arranges all estimation windows to be arranged. The termination condition is "there is no candidate for the arrangement position of the estimation window that satisfies the condition used when the arrangement position of the estimation window is tentatively acquired", "the number of the arranged estimation windows is a predetermined number", "the arranged estimation windows occupy the entire region or a predetermined percentage of the designated partial region of the image", or the like. Termination conditions other than the above conditions may be used.

After completion of the processing, the estimation window arrangement means 223 outputs the information about the arrangement of the registered estimation window indicating the position, size, and shape, and the object-number estimatable region which is associated with the estimation window indicated by the information and constituted by a set of rectangles.

As described above, the estimation window arrangement device 200 in the present exemplary embodiment includes the resolution map storage means 211 for storing the resolution and the relative position of the target object for the image position that are used to estimate the number of objects, and the estimation window information storage means 212 for storing the shape of the estimation window used to estimate the number of objects, and the size of the target object that is a reference for estimation in the estimation window.

The estimation window arrangement device 200 further includes the estimation window size acquisition means 221 for acquiring the size and shape of the estimation window, which is effective for estimation of the number of objects, for the image position using the information stored in the resolution map storage means 211 and the information stored in the estimation window information storage means 212.

The estimation window arrangement device 200 further includes the countable region acquisition means 222 for acquiring a region in which the number of target objects can be estimated using the effective estimation window for the image position using the information stored in the resolution map storage means 211 and the information stored in the estimation window information storage means 212.

The estimation window arrangement device 200 further includes the estimation window arrangement means 223 for acquiring a region in which the number of target objects can be estimated using the size and shape of the estimation window, which is effective for estimating the number of objects, for an arbitrary image position and the effective estimation window for the arbitrary image position, and for arranging the estimation window so that the acquired estimation window extensively includes a region in which the object-number estimatable region having the arranged estimation window is removed from the acquired region.

Figure 10:
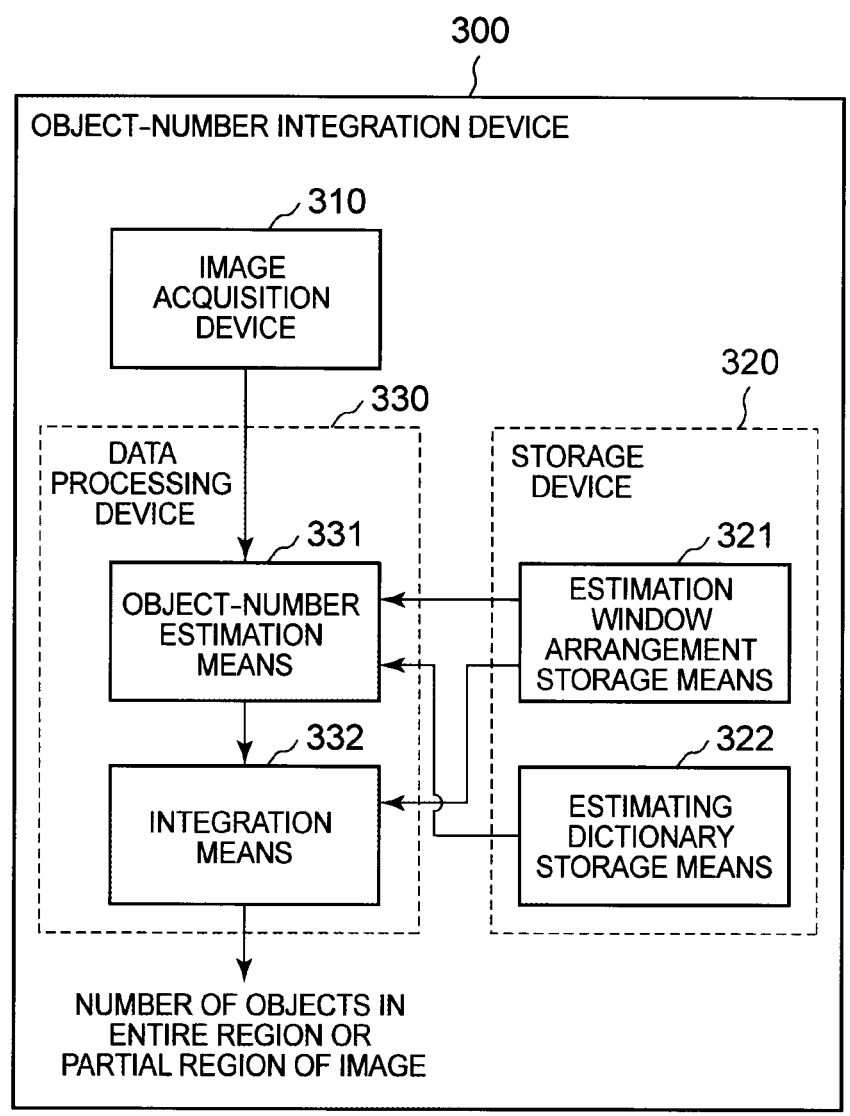
FIG. 10 is a block diagram showing a configuration example of an object-number integration device 300.

FIG. 10 is a block diagram showing a configuration example of the object-number integration device 300. As shown in FIG. 10, the object-number integration device 300 includes an image acquisition device 310, a storage device 320, and a data processing device 330. The image acquisition device 310 acquires an image, and the storage device 320 stores information used for estimating the number of objects. The operation of the data processing device 330 is controlled by, for example, executing programs by the CPU.

As shown in FIG. 10, the storage device 320 includes an estimation window arrangement storage means 321 and an estimating dictionary storage means 322.

The estimation window arrangement storage means 321 has a function of storing the information about arrangement of the estimation windows and the object-number estimatable region associated with the estimation windows indicated by the information and constituted by a set of rectangles, that are input from the estimation window arrangement device 200. Specifically, the information about the arrangement of the estimation window indicates the position, size, and shape of the estimation window.

Figure 11:
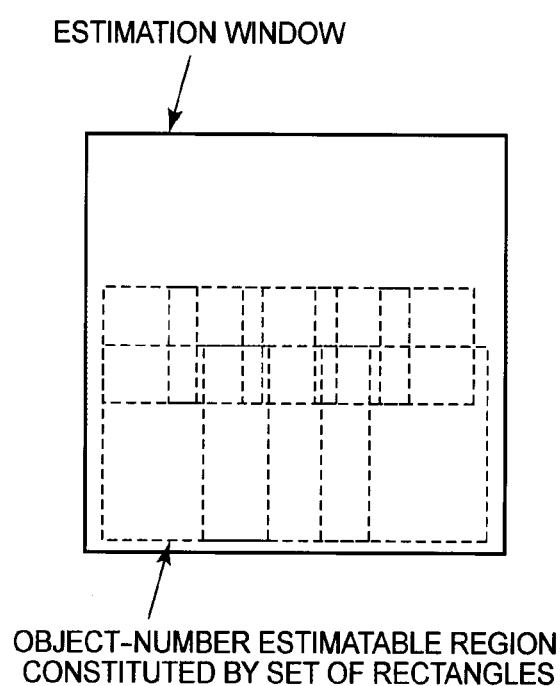
FIG. 11 is an explanatory diagram showing the relation between an estimation window and an object-number estimatable region associated with the estimation window and constituted by a set of rectangles.

FIG. 11 is an explanatory diagram showing the relation between an estimation window and an object-number estimatable region associated with the estimation window and constituted by a set of rectangles. In the example shown in FIG. 11, the object-number estimatable region associated with the estimation window and constituted by a set of rectangles is completely included in the estimation window.

The estimation window arrangement storage means 321 may store information manually generated by the user in addition to the information input from the estimation window arrangement device 200.

The estimating dictionary storage means 322 has a function of storing a dictionary of the estimator learned to estimate the number of counting target objects in a unit of estimation window.

As shown in FIG. 10, the data processing device 330 includes an object-number estimation means 331 and an integration means 332.

The object-number estimation means 331 has a function of estimating the number of counting target objects in each estimation window for the image acquired from the image acquisition device 310. The object-number estimation means 331 estimates the number of counting target objects in the estimation window using the information about the arrangement of the estimation window stored in the estimation window arrangement storage means 321, the dictionary of the learned estimator stored in the estimating dictionary storage means 322, and the estimator corresponding to the dictionary.

Specifically, the object-number estimation means 331 acquires, on the basis of the information about the arrangement of the estimation window stored in the estimation window arrangement storage means 321, a local image that corresponds to the arranged estimation window and is a part of the image acquired from the image acquisition device 310.

The object-number estimation means 331 estimates the number of counting target objects appearing in the acquired local image using the estimator corresponding to the dictionary stored in the estimating dictionary storage means 322. The object-number estimation means 331 estimates the number of counting target objects in each estimation window.

The integration means 332 has a function of estimating the number of objects in the entire region or a partial region of the image acquired from the image acquisition device 310. The integration means 332 estimates the number of objects using the number of counting target objects estimated in each estimation window and acquired from the object-number estimation means 331, and the object-number estimatable region associated with the estimation window, constituted by the set of rectangles, and acquired from the estimation window arrangement storage means 321.

Specifically, the integration means 332 converts the number of objects estimated in each estimation window and acquired from the object-number estimation means 331 into the density in each pixel in the object-number estimatable region. The converted density in each pixel is based on the object-number estimatable region associated with the estimation window acquired from the estimation window arrangement storage means 321, constituted by a set of rectangles.

Figure 12:
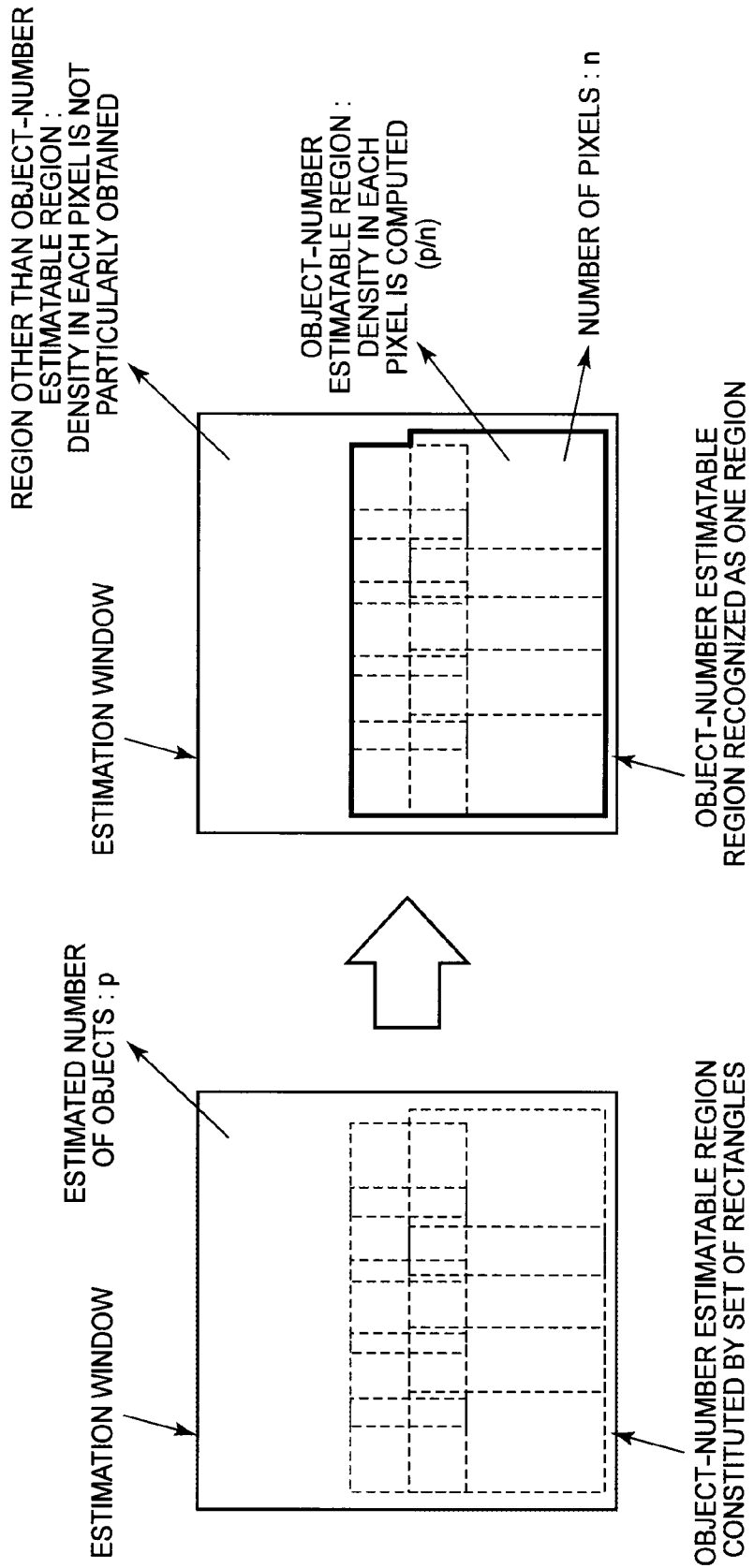
FIG. 12 is an explanatory diagram showing an example of conversion processing of the number of objects estimated in each estimation window into a density in each pixel by an integration means 332.

An example of the conversion to the density in each pixel is shown in FIG. 12. FIG. 12 is an explanatory diagram showing an example of conversion processing of the number of objects estimated in each estimation window into a density in each pixel by the integration means 332.

As shown in FIG. 12, the integration means 332 recognizes the object-number estimatable region constituted by a set of rectangles as one region. When there is a portion where the regions overlap each other, the integration means 332 temporarily ignores the overlapped portion.

Next, the integration means 332 computes the number of pixels in the region recognized as one region, and divides the number of objects estimated using the estimation window by the computed number of pixels. By dividing, the integration means 332 obtains the density in each pixel in the object-number estimatable region.

In the example shown in FIG. 12, the number of objects estimated using the estimation window is "p". The number of pixels in the region recognized as one region is "n". Thus, the density in each pixel in the object-number estimatable region is "p/n". As shown in FIG. 12, the integration means 332 does not particularly give a density in each pixel to the portion other than the object-number estimatable region.

The integration means 332 further has a function of adjusting the density in each pixel in the portion in which the object-number estimatable regions overlap each other in each estimation window.

The estimation window arrangement means 223 basically determines the arrangement position of the estimation window so that the portion in which the estimatable regions overlap each other does not exist. However, at the time of arranging the estimation windows, according to a place, there can be a region in which it is difficult to perform estimation unless the estimatable regions overlap each other. Therefore, in order not to generate a region in which it is difficult to perform estimation, the estimation window arrangement means 223 arranges the estimation windows so that the region in which the estimatable regions overlap each other is minimized. That is, there is a possibility of generating a portion in which the estimatable regions overlap each other in the present exemplary embodiment, and the integration means 332 has a function of adjusting the density in each pixel in the overlapped portion.

Figure 13:
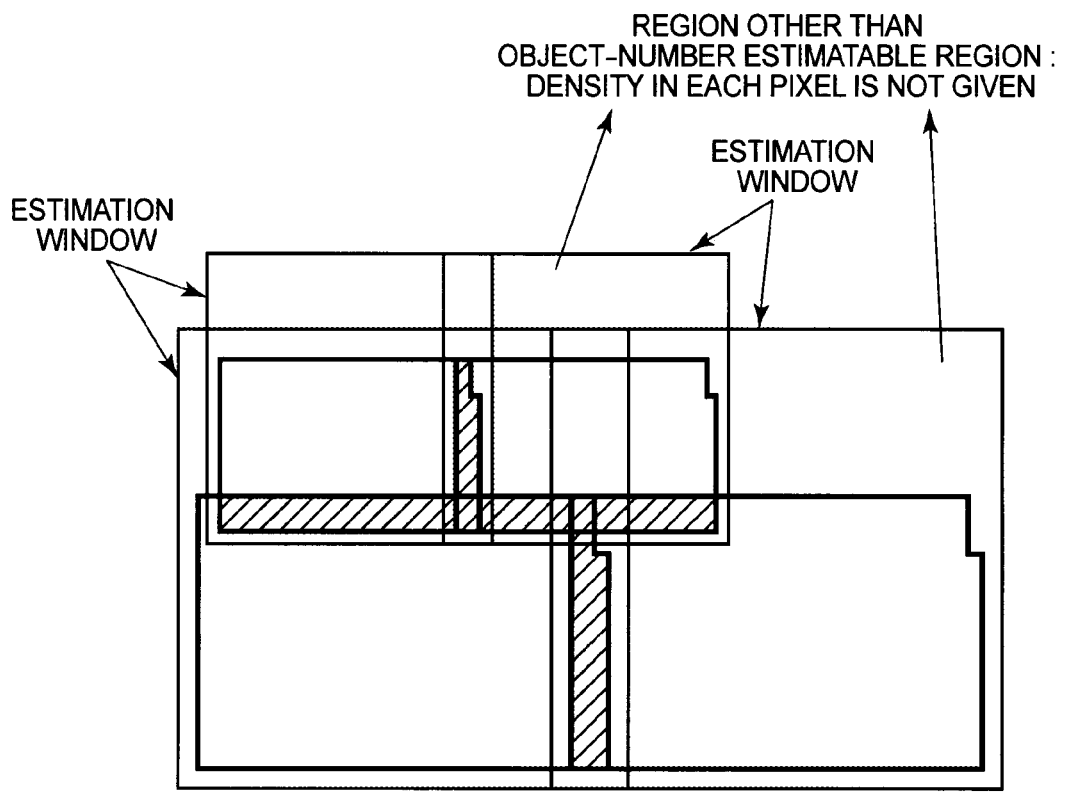
FIG. 13 is an explanatory diagram showing an example of computation processing of a density in each pixel in a portion in which object-number estimatable regions overlap each other by the integration means 332.

FIG. 13 is an explanatory diagram showing an example of computation processing of a density in each pixel in a portion in which object-number estimatable regions overlap each other by the integration means 332. As shown in FIG. 13, the density in each pixel is given to the object-number estimatable region. However, the density in each pixel is not given to a region other than the object-number estimatable region.

After the conversion to the density in each pixel, as shown in FIG. 13, the integration means 332 computes the average value of the densities in the pixels in the portion (the region indicated by hatching) in which the object-number estimatable regions overlap each other in each estimation window. The integration means 332 changes the density in each pixel in the overlapping portion to the computed average value of the densities in the pixels.

Next, the integration means 332 estimates the number of objects in the entire region or a partial region of the image acquired from the image acquisition device 310 by summing the computed densities in the pixels. The partial region is, for example, a region in the image which the user specifies and desires to estimate the number of objects.

The object-number integration device 300 according to the present exemplary embodiment includes the estimation window arrangement storage means 321 for storing information about the arrangement of the estimation window and the object-number estimatable region associated with the estimation window, and the estimating dictionary storage means 322 for storing the dictionary of the estimator learned to estimate the number of target objects in a unit of estimation window.

The object-number integration device 300 further includes the object-number estimation means 331 for acquiring, on the basis of the information about the arrangement of the estimation window, the local image which corresponds to the arranged estimation window and is a part of the image acquired from the image acquisition device 310, and for estimating the number of target objects in each estimation window using the dictionary of learned estimator and the estimator corresponding to the dictionary.

The object-number integration device 300 further includes the integration means 332 for converting the number of target objects estimated in each estimation window into the density in each pixel in the estimatable region using the object-number estimatable region associated with the estimation window. The integration means 332 estimates the number of objects in the entire region or a partial region of the image by computing the average value of the densities in the pixels in the portion in which the object-number estimatable regions overlap each other in each estimation window and summing the densities in the pixels.

The object counting system 100 in the present exemplary embodiment can more accurately count target objects in an image by eliminating counting failures while suppressing erroneous counting caused by double counting.

The reason is that the estimation window arrangement means 223 acquires the size and shape of the estimation window, which is effective for estimation of the number of objects, and the object-number estimatable region using the estimation window effective for the image position, for an arbitrary image position. Then, the estimation window arrangement means 223 removes the object-number estimatable region having the arranged estimation window from the acquired region, and arranges the estimation window so that the acquired estimation window extensively includes the remaining region. This is for the object-number estimation means 331 to estimate the number of target objects at each image position using the appropriately arranged estimation window corresponding to the target objects.

Furthermore, the object counting system 100 in the present exemplary embodiment can more accurately estimate the number of objects in an image by reducing the influence of erroneous counting caused by double counting.

The reason is that the integration means 332 converts the number of target objects estimated in each estimation window into the density in each pixel in the estimatable region using the object-number estimatable region associated with each estimation window. Then, the integration means 332 estimates the number of objects in the entire region or a partial region of the image by computing the average value of the densities in the pixels in the portion in which the object-number estimatable regions overlap each other in each estimation window and summing the densities in the pixels. This is for the integration means 332 to adjust the estimation result of the number of objects in the portion in which the object-number estimatable regions overlap each other in each estimation window.

[Description of Operation]

Figure 14:
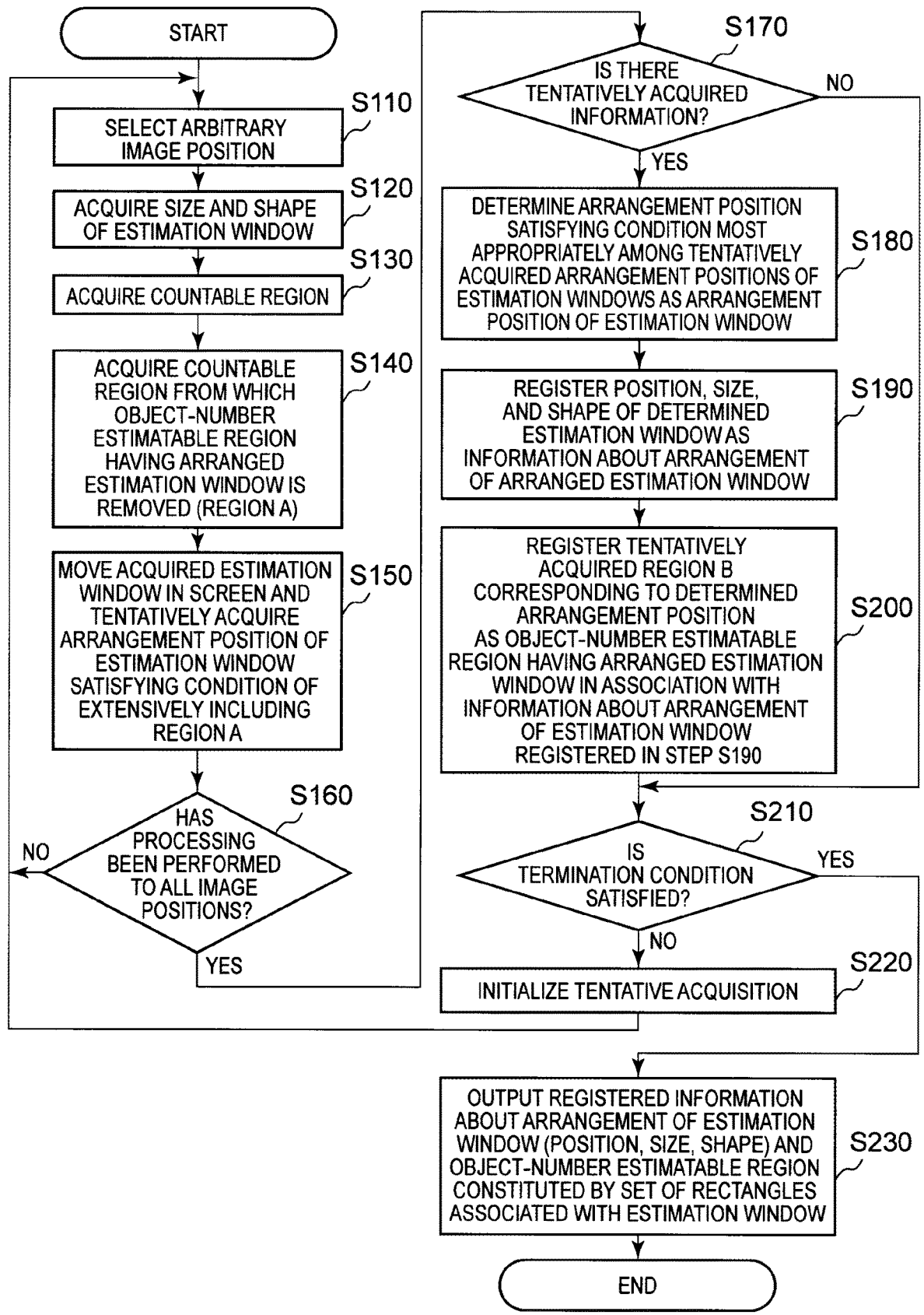
FIG. 14 is a flowchart showing an operation of estimation window arrangement processing by the estimation window arrangement device 200.
Figure 15:
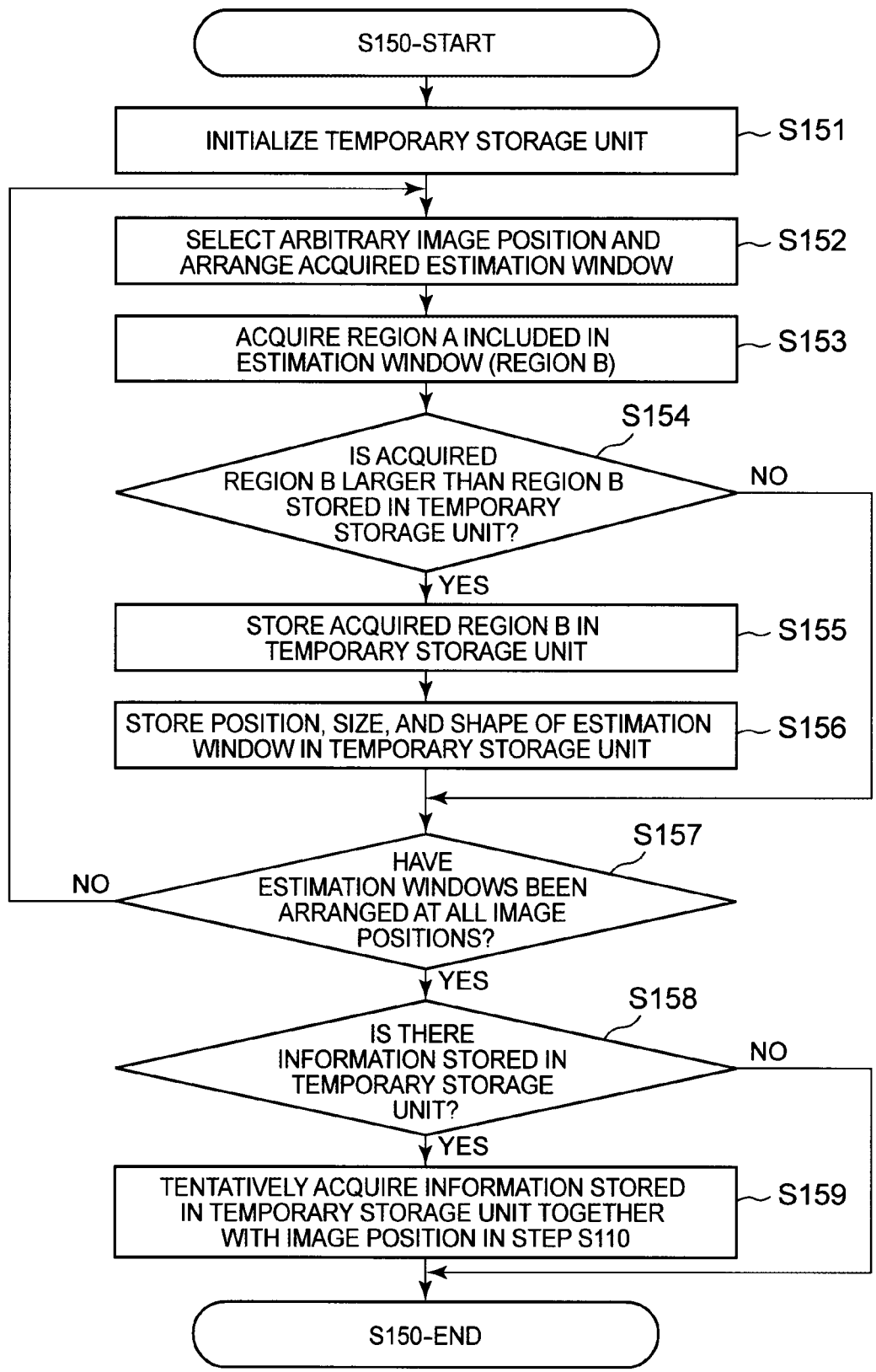
FIG. 15 is a flowchart showing an operation of tentative acquisition processing by the estimation window arrangement means 223.
Figure 16:
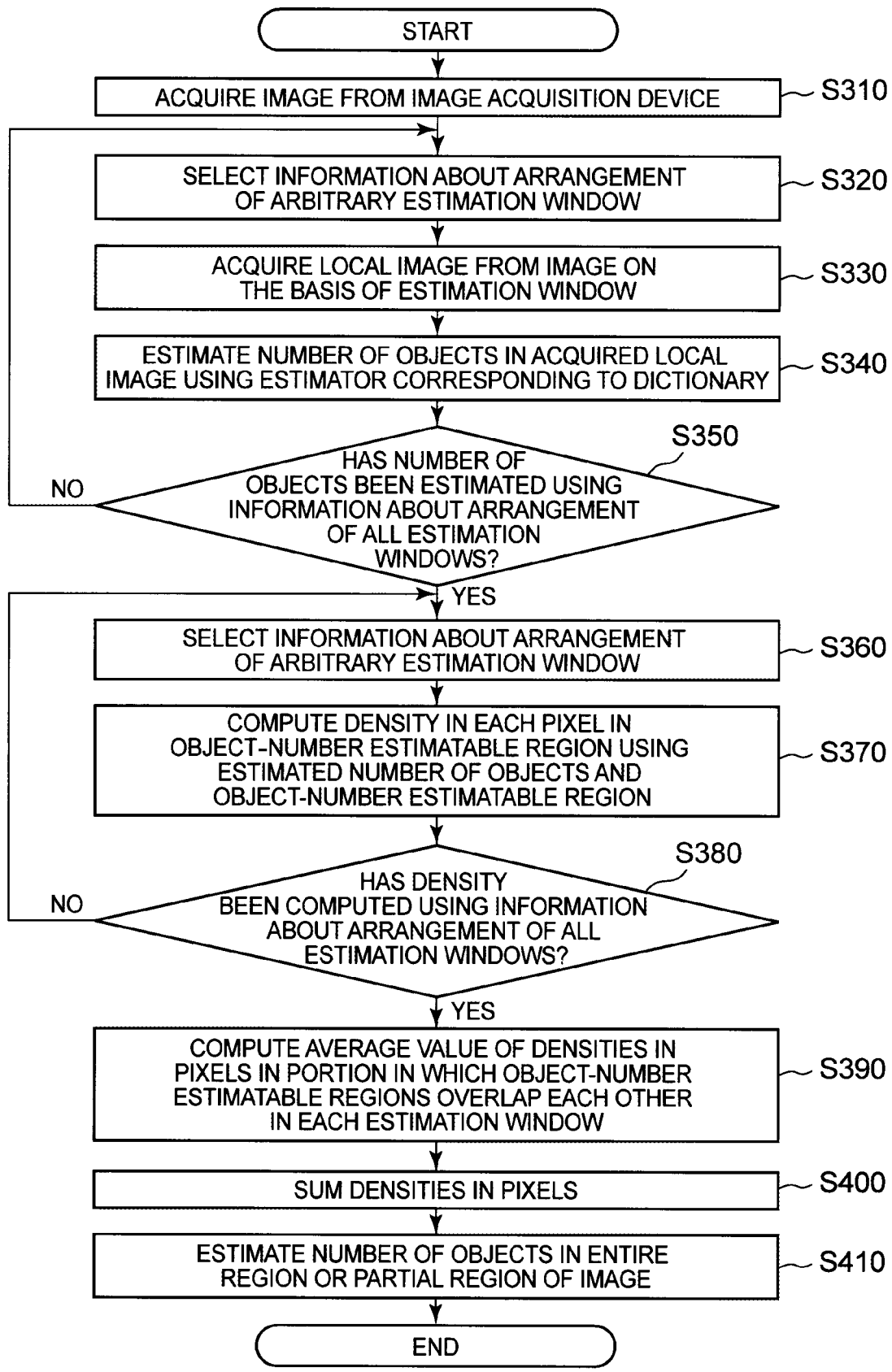
FIG. 16 is a flowchart showing an operation of object counting processing by the object-number integration device 300.

Hereinafter, the operation of the object counting system 100 in the present exemplary embodiment will be described with reference to FIGS. 14 to 16. The operation of the object counting system 100 includes the operation of the estimation window arrangement device 200 and the operation of the object-number integration device 300.

First, the operation of the estimation window arrangement device 200 for generating an estimation window optimal for more accurately counting objects in an image and appropriately arranging the generated estimation window in the target image will be described with reference to FIG. 14. FIG. 14 is a flowchart showing the operation of estimation window arrangement processing by the estimation window arrangement device 200.

The estimation window arrangement means 223 selects an arbitrary image position in the image in which the displayed counting target objects are counted (step S110).

Next, the estimation window arrangement means 223 acquires, from the estimation window size acquisition means 221, the size and shape of the estimation window corresponding to the selected image position (step S120).

Then, the estimation window arrangement means 223 acquires, from the countable region acquisition means 222, the countable region corresponding to the selected image position (step S130).

Next, the estimation window arrangement means 223 acquires the region A by removing, from the countable region acquired in step S130, the object-number estimatable region having the arranged estimation window (step S140).

Then, the estimation window arrangement means 223 moves the estimation window acquired in step S120 within the target image and searches for the arrangement position of the estimation window satisfying the condition that the estimation window extensively includes the region A. The estimation window arrangement means 223 tentatively acquires the searched arrangement position of the estimation window (step S150). The tentatively acquired arrangement position of the estimation window is, for example, the arrangement position that is tentatively acquired in the processing in step S159 to be described later.

Note that, the condition that the estimation window arrangement means 223 follows when searching for the arrangement position of the estimation window may include new conditions in addition to the above condition that the acquired estimation window extensively includes the region A. In the example shown in FIG. 14, no new condition is added.

Next, the estimation window arrangement means 223 determines whether the processing in steps S120 to S150 has been performed to all image positions (step S160).

When the processing has not been performed to all image positions (No in step S160), the estimation window arrangement means 223 selects an image position to which the processing in steps S120 to S150 has not been performed (step S110), and performs the processing in steps S120 to S150. The estimation window arrangement means 223 repeats the processing in steps S110 to S150 until the processing has been performed to all image positions.

When the processing has been performed to all image positions (Yes in step S160), the estimation window arrangement means 223 determines whether there is tentatively acquired information indicating the arrangement position of the estimation window (step S170). When there is no tentatively acquired information (No in step S170), the estimation window arrangement means 223 performs the processing in step S210.

When there is tentatively acquired information (Yes in step S170), the estimation window arrangement means 223 determines the arrangement position satisfying the condition most appropriately among the tentatively acquired arrangement positions of the estimation window as the arrangement position of the estimation window (step S180).

Next, the estimation window arrangement means 223 registers, as information about the arrangement of the arranged estimation window, the position, size, and shape of the estimation window the arrangement position of which has been determined (step S190).

Next, the estimation window arrangement means 223 registers the region A included in the estimation window at the determined arrangement position (a region B to be described later) as the object-number estimatable region having the arranged estimation window. The estimation window arrangement means 223 registers the region in association with the information about the arrangement of the estimation window registered in step S190 (step S200).

Next, the estimation window arrangement means 223 determines whether the termination condition is satisfied (step S210).

When the termination condition is not satisfied (No in step S210), the estimation window arrangement means 223 deletes the tentatively acquired information (step S220). Until the termination condition is satisfied, the estimation window arrangement means 223 repeats the processing in steps S110 to S200.

When the termination condition is satisfied (Yes in step S210), the estimation window arrangement means 223 outputs the registered information about the arrangement of the estimation window indicating the position, size and shape, and the region A included in the estimation window associated with the information about the arrangement of the estimation window (step S230).

The region A included in the estimation window output in step S230 is the object-number estimatable region constituted by a set of rectangles. After outputting the registered information, the estimation window arrangement device 200 terminates the estimation window arrangement process.

Next, the operation of the estimation window arrangement means 223 for tentatively acquiring the arrangement position of the estimation window in step S150 will be described in more detail with reference to FIG. 15. FIG. 15 is a flowchart showing an operation of tentative acquisition processing by the estimation window arrangement means 223.

After the processing in step S140, the estimation window arrangement means 223 initializes a temporary storage unit (not shown) that is included in the estimation window arrangement device 200 and temporarily stores information (step S151).

Then, the estimation window arrangement means 223 selects an arbitrary image position to search for the arrangement position of the estimation window satisfying the condition, and arranges the estimation window acquired in step S120 at the selected image position (step S152).

Next, the estimation window arrangement means 223 acquires the region A included in the estimation window (hereinafter, referred to as a region B) on the basis of the arranged estimation window and the region A (step S153). The region A and region B are each constituted by a set of rectangles like the countable region.

The estimation window arrangement means 223 determines whether the region B acquired in step S153 is larger than the region B acquired by other processing and stored in the temporary storage unit (step S154). In other words, the processing in step S154 is for confirming whether the newly acquired arrangement position of the estimation window satisfies the condition more appropriately.

When the region B acquired in step S153 is not larger, that is, the condition is satisfied less appropriately (No in step S154), the estimation window arrangement means 223 performs the processing in step S157.

When the region B acquired in step S153 is larger, that is, when the condition is satisfied more appropriately (Yes in step S154), the estimation window arrangement means 223 deletes the region B acquired by other processing and stored in the temporary storage unit, and stores the newly acquired region B in the temporary storage unit (step S155).

Then, the estimation window arrangement means 223 stores, in the temporary storage unit, the position, size, and shape of the estimation window corresponding to the stored region B (step S156).

Next, the estimation window arrangement means 223 determines whether the estimation windows have been arranged at all image positions (step S157).

When the estimation windows have not been arranged at all image positions (No in step S157), the estimation window arrangement means 223 repeats the processing in steps S152 to S156 until the estimation windows has been arranged at all image positions.

When the estimation windows have been arranged at all image positions (Yes in step S157), the estimation window arrangement means 223 determines whether there is information stored in the temporary storage unit (step S158). When there is no information stored in the temporary storage unit (No in step S158), the estimation window arrangement means 223 terminates the tentative acquisition processing.

When there is information stored in the temporary storage unit (Yes in step S158), the estimation window arrangement means 223 tentatively acquires the information stored in the temporary storage unit together with the image position selected in step S110 (step S159). After the tentative acquisition, the estimation window arrangement means 223 terminates the tentative acquisition processing.

Next, the operation of the object-number integration device 300 for counting objects in an image by counting the number of persons using appropriately arranged estimation windows and appropriately integrating the number of persons counted in each estimation window will be described with reference to FIG. 16. FIG. 16 is a flowchart showing an operation of object counting processing by the object-number integration device 300.

The object-number estimation means 331 acquires an image from the image acquisition device 310 (step S310). Next, the object-number estimation means 331 selects information about the arrangement of an arbitrary estimation window from the information about the arrangement of the estimation windows stored in the estimation window arrangement storage means 321 (step S320).

Then, the object-number estimation means 331 acquires a local image that is an image included in the arranged estimation window using the acquired image and the selected information about the arrangement of the estimation window (step S330).

Next, the object-number estimation means 331 estimates the number of objects appearing in the acquired local image using the estimator corresponding to the dictionary stored in the estimating dictionary storage means 322 (step S340).

Then, the object-number estimation means 331 determines whether the number of objects has been estimated using the information about the arrangement of all estimation windows stored in the estimation window arrangement storage means 321 (step S350).

When the number of objects has not been estimated using the information about the arrangement of all estimation windows (No in step S350), the object-number estimation means 331 repeats the processing in steps S320 to S340 until the number of objects has been estimated using the information about the arrangement of all estimation windows.

When the object-number estimation means 331 has estimated the number of objects using the information about the arrangement of all estimation windows (Yes in step S350), the integration means 332 selects the information about the arrangement of an arbitrary estimation window from the information about the arrangement of the estimation windows stored in the estimation window arrangement storage means 321 (step S360).

Next, the integration means 332 acquires, from the object-number estimation means 331, the estimated number of objects corresponding to the estimation window indicated by the selected information. The integration means 332 also acquires, from the estimation window arrangement storage means 321, the object-number estimatable region associated with the estimation window indicated by the selected information.

Next, the integration means 332 computes the density in each pixel in the object-number estimatable region using the acquired number of objects and object-number estimatable region (step S370).

Then, the integration means 332 determines whether the density in each pixel has been computed using the information about the arrangement of all estimation windows stored in the estimation window arrangement storage means 321 (step S380).

When the density in each pixel has not been computed using the information about the arrangement of all estimation windows (No in step S380), the integration means 332 repeats the processing in steps S360 to S370 until the density in each pixel has been computed using information about the arrangement of all estimation windows.

When the density in each pixel has been computed using the information about the arrangement of all estimation windows (Yes in step S380), the integration means 332 computes the average value of the densities in the pixels of the portion in which the object-number estimatable regions overlap each other in each estimation window (step S390).

Next, the integration means 332 sums the computed densities in the pixels (step S400). The integration means 332 estimates the number of objects in the entire region or the partial region of the image acquired from the image acquisition device 310 using the sum of the densities in the pixels (step S410). After estimating the number of objects, the object-number integration device 300 terminates the object counting processing.

The estimation window arrangement means in the present exemplary embodiment acquires the size and shape of the estimation window, which is effective for estimation of the number of objects, and the object-number estimatable region using the estimation window effective for the image position, for an arbitrary image position. Next, the estimation window arrangement means removes the object-number estimatable region having the arranged estimation window from the acquired region, and arranges the estimation window so that the acquired estimation window extensively includes the remaining region.

Then, the object-number estimation means estimates the number of target objects at each image position using the appropriately arranged estimation windows corresponding to the target objects. Thus, the object-number estimation means can prevent counting failures while suppressing erroneous counting caused by double counting, and can count the objects in the image more accurately. Furthermore, since the number of estimation windows to be arranged is not too many but an appropriate number, the object-number estimation means can accurately and quickly perform the counting processing of the objects in the image.

The integration means in the present exemplary embodiment converts the number of target objects estimated in each estimation window into the density in each pixel in the estimatable region using the object-number estimatable region associated with each estimation window. Furthermore, the integration means estimates the number of objects in the entire region or a partial region of the image by computing the average value of the densities in the pixels in the portion in which the object-number estimatable regions overlap each other in each estimation window and summing the densities in the pixels.

That is, since the integration means adjusts the estimation result of the number of objects in the portion in which the object-number estimatable regions overlap each other in each estimation window, the influence of erroneous counting caused by double counting is reduced and the number of objects in the image can be more accurately estimated.

As described above, the object counting system estimates the number of target objects at each image position using the appropriately arranged estimation windows corresponding to the target objects, and adjusts the estimation result of the number of objects in the portion in which the object-number estimatable regions overlap each other in each estimation window using the estimation result estimated in each estimation window. By the above processing, the object counting system can estimate the number of target objects in the image more accurately.

Figure 17:
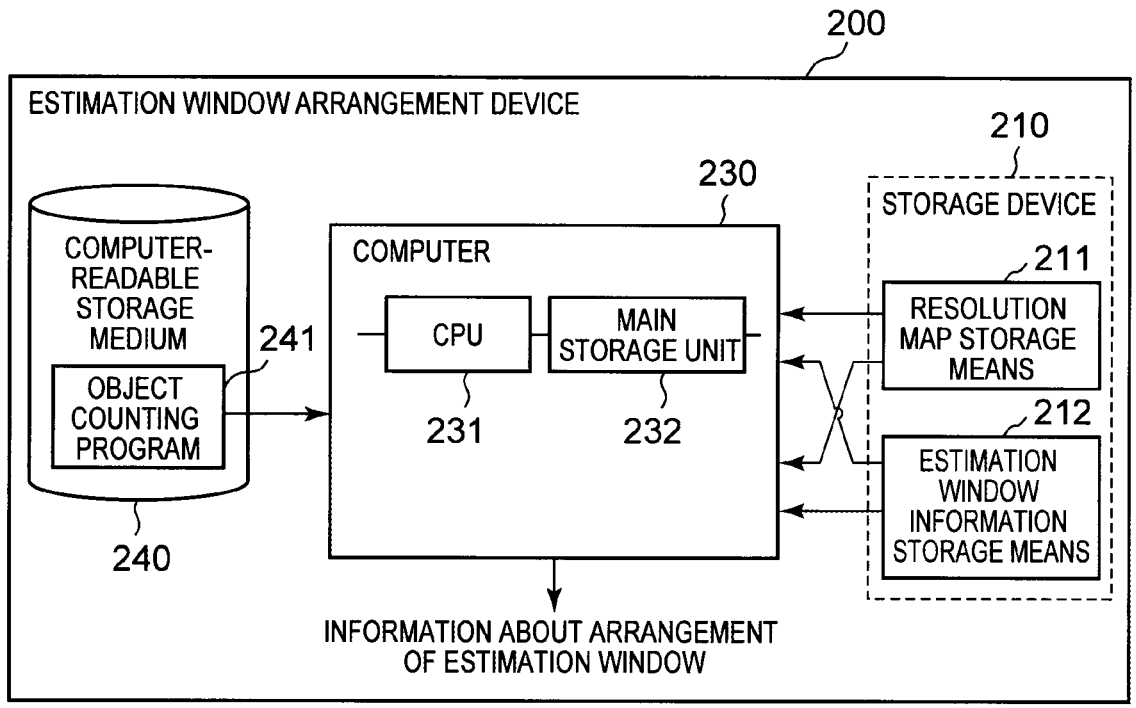
FIG. 17 is a block diagram showing a hardware configuration example of an estimation window arrangement device according to the present invention.

Hereinafter, a specific example of a hardware configuration of the estimation window arrangement device 200 will be described. FIG. 17 is a block diagram showing the hardware configuration example of the estimation window arrangement device according to the present invention.

As shown in FIG. 17, the estimation window arrangement device 200 includes a storage device 210, a computer 230, and a computer-readable storage medium 240. The storage device 210 and the computer-readable storage medium 240 are connected to the computer 230. The computer-readable storage medium 240 stores an object counting program 241.

The computer 230 includes a CPU 231 and a main storage unit 232. The main storage unit 232 is used as a work region of data and a temporary save region of data. The main storage unit 232 is, for example, a random access memory (RAM). The computer-readable storage medium 240 is implemented by a magnetic disk, a semiconductor memory, or the like.

The computer 230 is implemented by software by executing, by the CPU 231 shown in FIG. 17, the object counting program 241 that provides the functions of constituent elements shown in FIG. 2.

In the case of being implemented by software, the CPU 231 loads the object counting program 241 stored in the computer-readable storage medium 240 into the main storage unit 232 and executes it at the time of starting the computer 230, and controls the operation of the computer 230, whereby the functions are implemented by software. For example, the CPU 231 causes the computer 230 to perform the estimation window generation processing shown in FIG. 14.

Note that, the computer 230 may be implemented by hardware. For example, the computer 230 may have a circuit including a hardware component such as a large scale integration (LSI) incorporating a program for implementing the functions as shown in FIG. 2.

Figure 18:
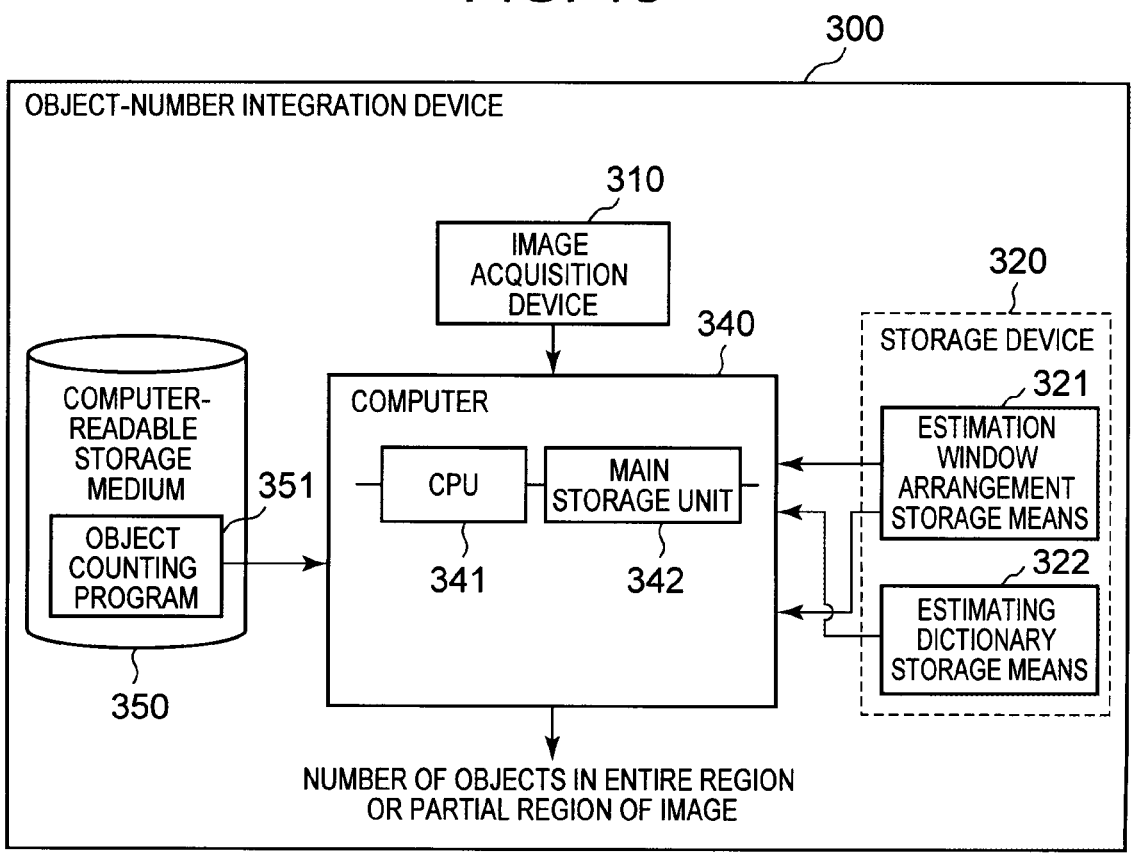
FIG. 18 is a block diagram showing a hardware configuration example of an object-number integration device according to the present invention.

A specific example of the hardware configuration of the object-number integration device 300 will be described below. FIG. 18 is a block diagram showing the hardware configuration example of the object-number integration device according to the present invention.

As shown in FIG. 18, the object-number integration device 300 includes an image acquisition device 310, a storage device 320, a computer 340, and a computer-readable storage medium 350. The image acquisition device 310, the storage device 320, and the computer-readable storage medium 350 are connected to the computer 340. The computer-readable storage medium 350 stores an object counting program 351.

The computer 340 includes a CPU 341 and a main storage unit 342. The main storage unit 342 is used as a work region of data and a temporary save region of data. The main storage unit 342 is, for example, a RAM. The computer-readable storage medium 350 is implemented by a magnetic disk, a semiconductor memory, or the like.

The computer 340 is implemented by software by executing, by the CPU 341 shown in FIG. 18, the object counting program 351 which provides the functions of constituent elements shown in FIG. 10.

In the case of being implemented by software, the CPU 341 loads the object counting program 351 stored in the computer-readable storage medium 350 into the main storage unit 342 and executes it at the time of starting the computer 340, and controls the operation of the computer 340, whereby the functions are implemented by software. For example, the CPU 341 causes the computer 340 to perform the object counting processing shown in FIG. 16.

Note that, the computer 340 may be implemented by hardware. For example, the computer 340 may have a circuit including a hardware component such as an LSI incorporating a program for implementing the functions as shown in FIG. 10.

Figure 19:
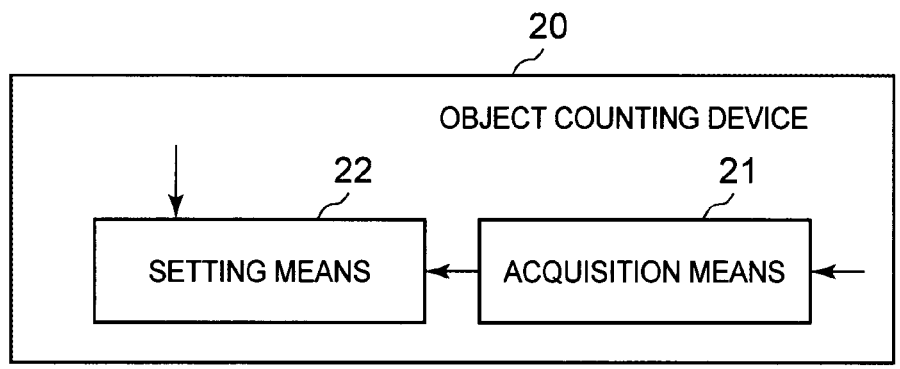
FIG. 19 is a block diagram showing an outline of an object counting device according to the present invention.

Next, the outline of the present invention will be described. FIG. 19 is a block diagram showing an outline of the object counting device according to the present invention. An object counting device 20 according to the present invention includes an acquisition means 21 (for example, the estimation window size acquisition means 221) for acquiring information of an estimation area which is a partial area of an image with which partial area a predetermined condition related to objects to be counted shown in the image are associated, the estimation area being a unit of area for estimating the number of the objects to be counted, and a setting means 22 (for example, the estimation window arrangement means 223) for setting the estimation area in the image in such a manner that the estimation area indicated by the acquired information of the estimation area includes the objects to be counted which are not included in the objects to be counted in a different estimation area, and which satisfy the predetermined condition.

With this configuration, the object counting device can more accurately count objects in an image.

The object counting device 20 further includes an area acquisition means (for example, the countable region acquisition means 222) for acquiring an area showing the objects to be counted satisfying the predetermined condition associated with the estimation area in the image, in which the setting means 22 may set the estimation area in an area in which an area in which the number of the objects to be counted shown in the other estimation area set in the area is estimatable is removed from the acquired area.

With this configuration, the object counting device can perform the arrangement processing of estimation windows in a shorter time.

The area acquired by the area acquisition means, the other estimation area set in the area, and the area in which the area in which the number of the objects to be counted shown in the set other estimation area is estimatable is removed from the acquired area may be constituted by a set of rectangles indicating the objects to be counted.

With this configuration, the object counting device can determine the place at which the estimation window is to be arranged more accurately.

The setting means 22 may set an area constituted by a set of rectangles constituting the area acquired by the area acquisition means from which rectangles included in both sets of rectangles constituting the area acquired by the area acquisition means and of rectangles constituting another estimation area set in the area to an area in which the area in which the number of the objects to be counted indicated in the set other estimation area can be estimated is removed from the acquired area.

With this configuration, the object counting device can determine the place at which the estimation window is to be arranged more accurately.

In addition, the setting means 22 may set the estimation area such that the estimation area most extensively includes the area in which the area in which the number of the objects to be counted indicated in the set other estimation region can be estimated is removed from the acquired region.

With this configuration, the object counting device can reduce the number of estimation windows to be arranged.

In addition, the setting means 22 may set the estimation area so as to satisfy a condition that the area in which the estimation area most extensively includes the area in which the number of the objects to be counted indicated in the set other estimation area can be estimated is removed from the acquired area, and other conditions.

In addition, the setting means 22 may output information about the setting of the estimation area indicating the position, size, and shape of the estimation area, and the image corresponding to the estimation area set on the basis of the information.

With this configuration, the object counting device can provide an image in which estimation can be performed to a device that counts objects in the image.

The object counting device 20 may further include a resolution map storage means (for example, the resolution map storage means 211) for storing the resolution and the relative position of the objects to be counted for the image position used for estimating the number of objects using the estimation window as the estimation area, and an estimation window information storage means (for example, the estimation window information storage means 212) for storing the shape of the estimation window used for estimating the number of objects and the size of the objects to be counted satisfying a predetermined condition associated with the estimation window.

The acquisition means 21 may acquire the size and shape of the estimation window, which is effective for counting the objects to be counted, for the image position using the information stored in the resolution map storage means and the information stored in the estimation window information storage means.

The area acquisition means may acquire an area in which the number of the objects to be counted can be counted using the estimation window, which is effective for counting the objects to be counted, for the image position using the information stored in the resolution map storage means and the information stored in the estimation window information storage means.

Figure 20:
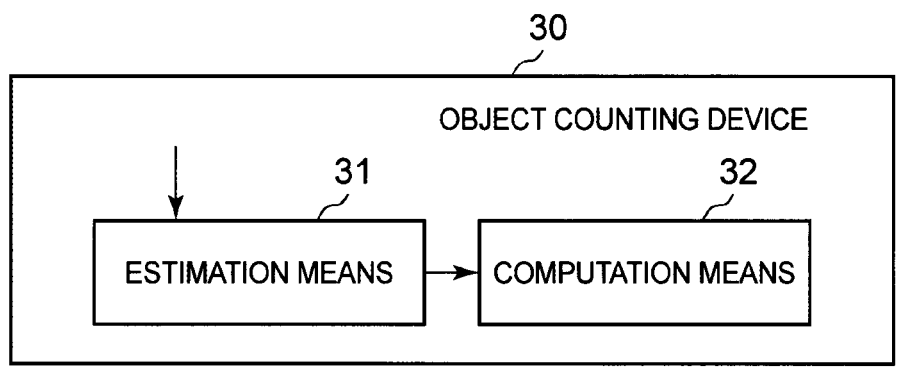
FIG. 20 is a block diagram showing another outline of the object counting device according to the present invention.

FIG. 20 is a block diagram showing another outline of the object counting device according to the present invention. An object counting device 30 according to the present invention includes an estimation means 31 (for example, the object-number estimation means 331) for estimating, in each estimation area, the number of the objects to be counted shown in an estimation area set in an image where is a partial area of the image, and is a unit of area in which the number of the objects to be counted is estimated, and a computation means 32 (for example, the integration means 332) for computing a density of the objects to be counted in an area where predetermined areas in the estimation area are overlapped using the number of the objects to be counted that has been estimated in each estimation area.

With this configuration, the object counting device can more accurately count objects in an image.

The computation means 32 may compute the density of the objects to be counted in an area satisfying a predetermined condition in each estimation area using the number of the objects to be counted that has been estimated in each estimation area, and computes an average value of the computed densities as the density of the objects to be counted in the area where predetermined areas in the estimation area are overlapped.

With this configuration, the object counting device can bring the density of the counting target object in the region in which the estimation windows overlap each other close to the density of the counting target object in the image.

The object counting device 30 may include, when the estimation window is used as the estimation area, an estimation window arrangement storage means (for example, the estimation window arrangement storage means 321) for storing information about the arrangement of the estimation window and the area in which the number of objects associated with the estimation window, and an estimating dictionary storage means (for example, the estimating dictionary storage means 322) for storing the dictionary of an estimator learned to estimate the number of the objects to be counted in a unit of estimation window.

The estimation means 31 may acquire a local image from the image acquired by an image acquisition device (for example, the image acquisition device 310) on the basis of the information about the arrangement of the estimation window, and estimate the number of the objects to be counted in each estimation window using the dictionary corresponding to the learned estimator.

The computation means 32 may estimate the number of objects in the entire area or a partial area of the image by summing the computed densities of the objects to be counted.

Figure 21:
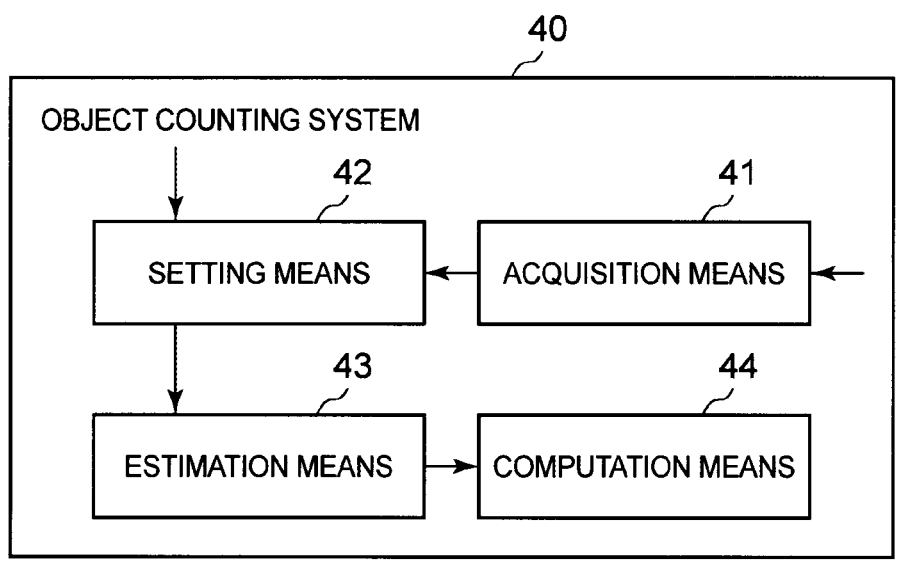
FIG. 21 is a block diagram showing an outline of the object counting system according to the present invention.
Figure 22:
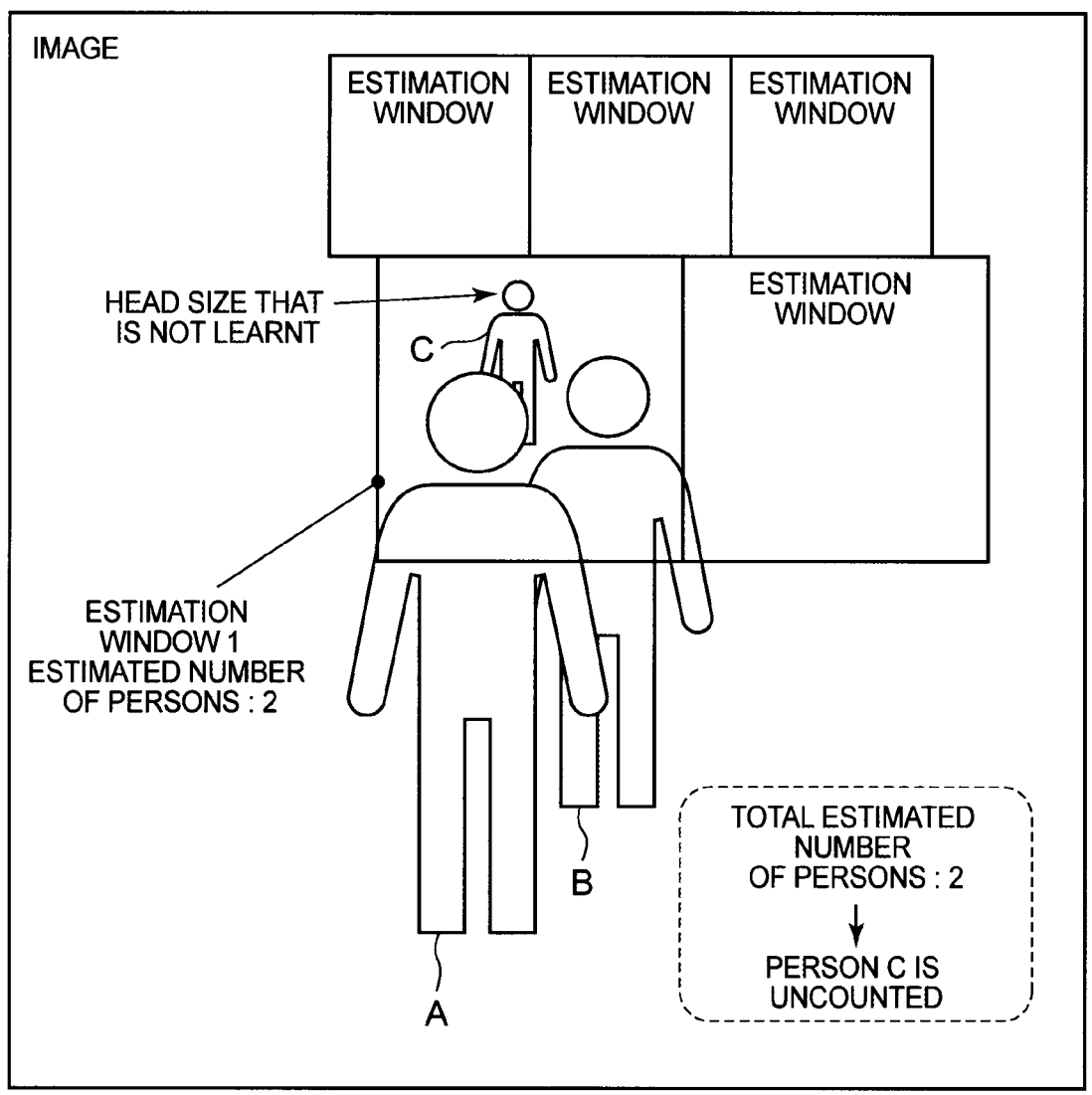
FIG. 22 is an explanatory diagram showing an example of a method for counting persons appearing in an image using estimation windows.
Figure 23:
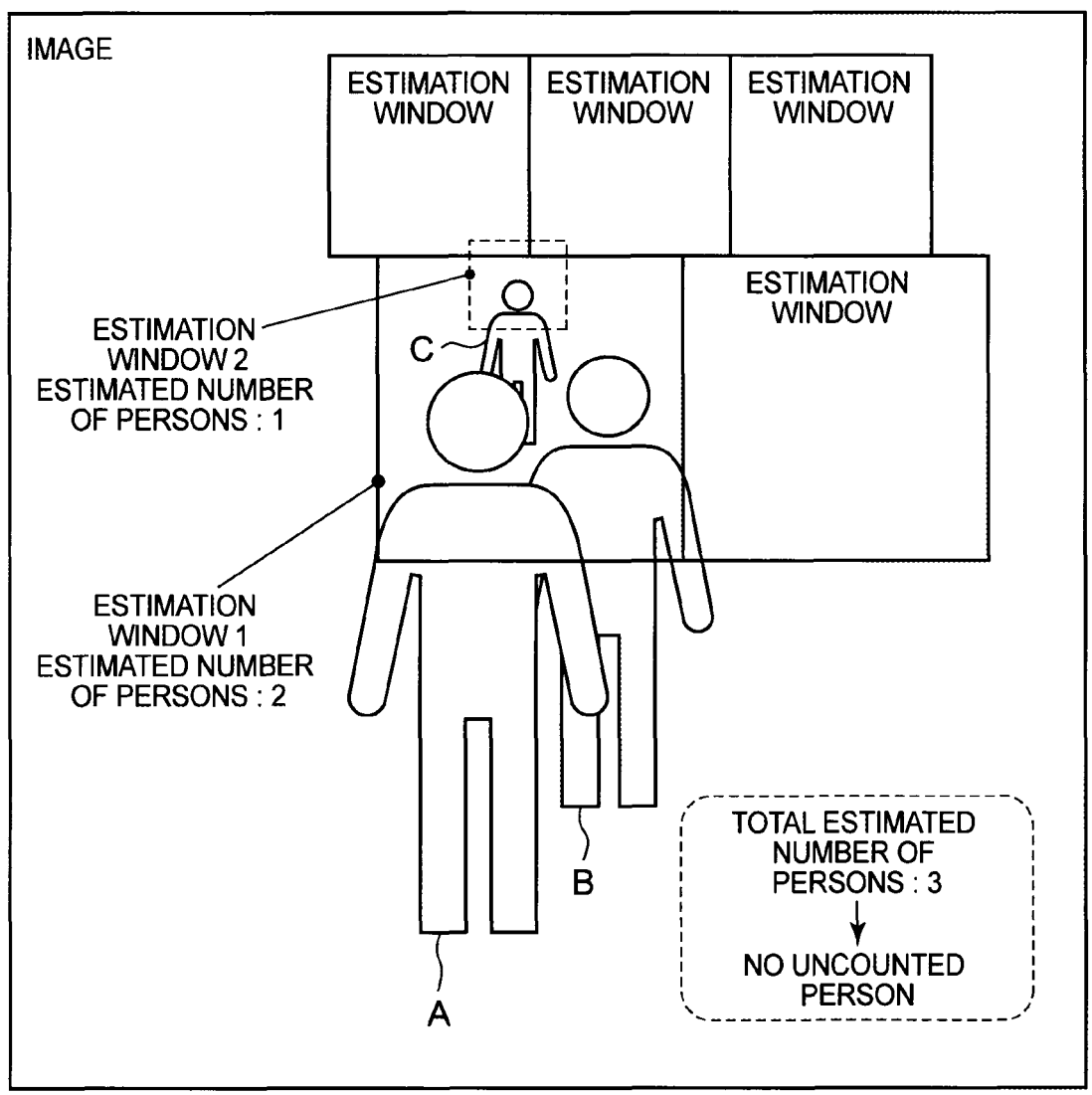
FIG. 23 is an explanatory diagram showing another example of a method for counting persons appearing in an image using estimation windows.
Figure 24:
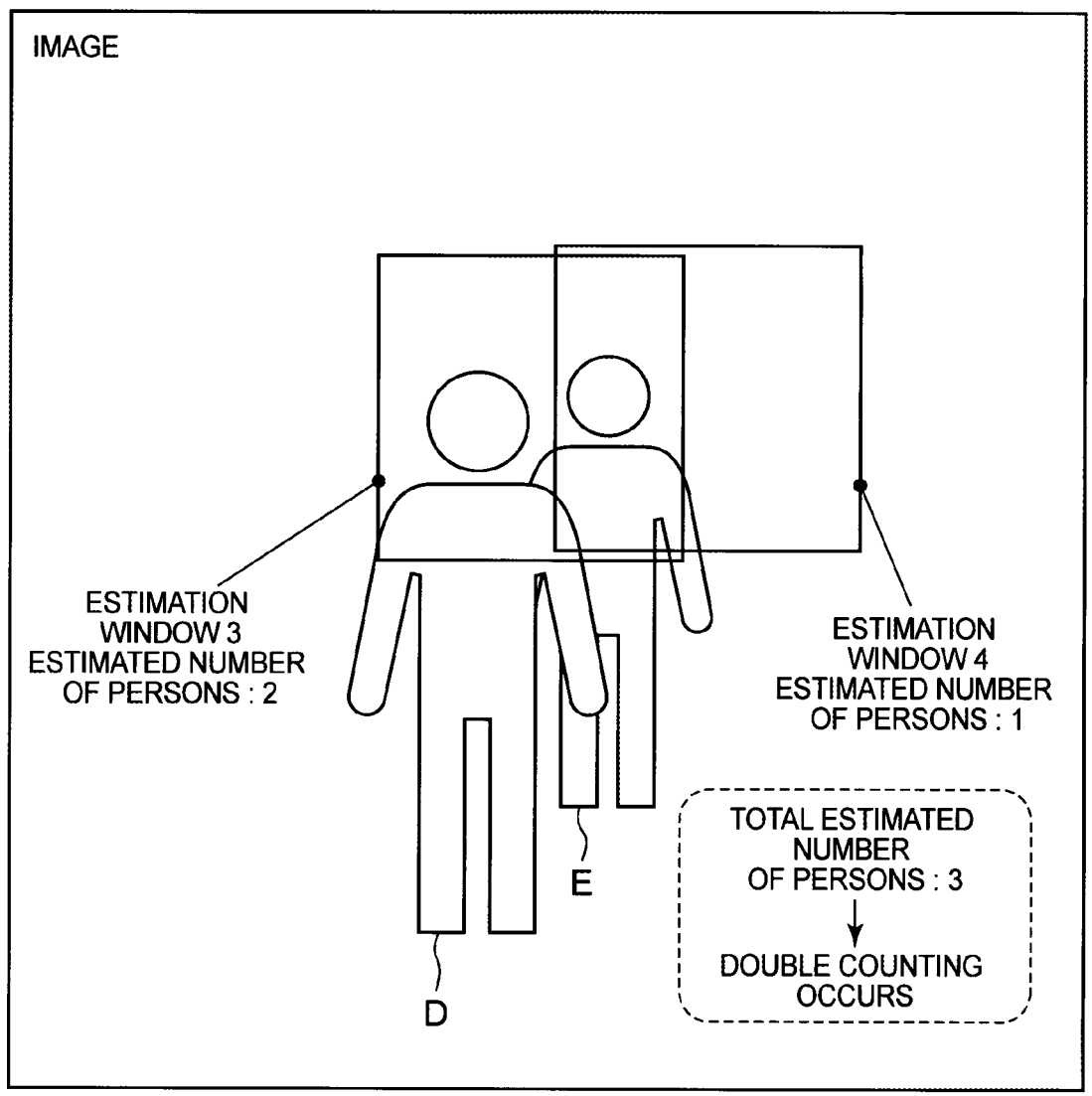
FIG. 24 is an explanatory diagram showing another example of a method for counting persons appearing in an image using estimation windows.

FIG. 21 is a block diagram showing an outline of the object counting system according to the present invention. An object counting system 40 according to the present invention includes an acquisition means 41 (for example, the estimation window size acquisition means 221) for acquiring information of an estimation area which is a partial area of an image with which partial area a predetermined condition related to objects to be counted shown in the image are associated, the estimation area being a unit of area for estimating the number of the objects to be counted, a setting means 42 (for example, the estimation window arrangement means 223) for setting the estimation area in the image in such a manner that the estimation area indicated by the acquired information of the estimation area includes the objects to be counted which are not included in the objects to be counted in a different estimation area, and which satisfy the predetermined condition, an estimation means 43 (for example, the object-number estimation means 331) for estimating, in each estimation area, the number of the objects to be counted shown in the estimation area set in the image, and a computation means 44 (for example, the integrated means 332) for computing a density of the objects to be counted in an area where predetermined areas in the estimation area are overlapped using the number of the objects to be counted that has been estimated in each estimation area.

With this configuration, the object counting system can more accurately count objects in an image.

In addition, a part or all of the above exemplary embodiment can also be described as follows, but is not limited to the following.

(Supplementary Note 1)

An object counting method includes acquiring information of an estimation area which is a partial area of an image with which partial area a predetermined condition related to objects to be counted shown in the image are associated, the estimation area being a unit of area for estimating the number of the objects to be counted, and setting the estimation area in the image in such a manner that the estimation area indicated by the acquired information of the estimation area includes the objects to be counted which are not included in the objects to be counted in a different estimation area, and which satisfy the predetermined condition.

(Supplementary Note 2)

The object counting method according to supplementary note 1 further includes acquiring an area showing the objects to be counted satisfying the predetermined condition associated with the estimation area in the image, and setting the estimation area in an area in which an area in which the number of the objects to be counted shown in the other estimation area set in the area is estimatable is removed from the acquired area.

(Supplementary Note 3)

The object counting method according to supplementary note 1 or 2, in which the acquired area, the other estimation area set in the area, and the area in which the area in which the number of the objects to be counted shown in the set other estimation area is estimatable is removed from the acquired area may be constituted by a set of rectangles indicating the objects to be counted.

(Supplementary Note 4)

The object counting method according to supplementary note 3, in which the acquired area constituted by a set of rectangles constituting the area from which rectangles included in both sets of rectangles constituting the area and of rectangles constituting another estimation area set in the region may be set to an area in which the area in which the number of the objects to be counted indicated in the set other estimation area is estimatable is removed from the acquired area.

(Supplementary Note 5)

The object counting method according to any one of supplementary notes 2 to 4, in which the estimation area is set such that the estimation area most extensively includes the area in which the area in which the number of the objects to be counted indicated in the set other estimation area is estimatable is removed from the acquired area.

(Supplementary Note 6)

The object counting method according to any one of supplementary notes 2 to 4, in which the estimation area is set such that the estimation area satisfies a condition that the area in which the area in which the number of the objects to be counted indicated in the set other estimation area is estimatable is removed from the acquired area is most extensively included, and other conditions.

(Supplementary Note 7)

The object counting method according to any one of supplementary notes 1 to 6, in which information about the setting of the estimation area indicating the position, size, and shape of the estimation area, and the image corresponding to the estimation area set on the basis of the information are output.

(Supplementary Note 8)

An object counting method includes estimating, in each estimation area, the number of the objects to be counted shown in an estimation area set in an image where is a partial area of the image, and is a unit of area in which the number of the objects to be counted is estimated, and computing a density of the objects to be counted in an area where predetermined areas in the estimation area are overlapped using the number of the objects to be counted that has been estimated in each estimation area.

(Supplementary Note 9)

The object counting method according to supplementary note 8 includes computing the density of the objects to be counted in an area satisfying a predetermined condition in each estimation area using the number of the objects to be counted that has been estimated in each estimation area, and computing an average value of the computed densities as the density of the objects to be counted in the area where predetermined areas in the estimation area are overlapped.

(Supplementary Note 10)

An object counting program causes a computer to perform acquisition processing for acquiring information of an estimation area which is a partial area of an image with which partial area a predetermined condition related to objects to be counted shown in the image are associated, the estimation area being a unit of area for estimating the number of the objects to be counted, and setting processing for setting the estimation area in the image in such a manner that the estimation area indicated by the acquired information of the estimation area includes the objects to be counted which are not included in the objects to be counted in a different estimation area, and which satisfy the predetermined condition.

(Supplementary Note 11)

The object counting program according to supplementary note 10 causes the computer to perform processing for acquiring an area showing the objects to be counted satisfying the predetermined condition associated with the estimation area in the image, and setting processing for setting the estimation area in an area in which an area in which the number of the objects to be counted shown in the other estimation area set in the area is estimatable is removed from the acquired area.

(Supplementary Note 12)

The object counting program according to supplementary note 10 or 11, in which the acquired area, the other estimation area set in the area, and the area in which the area in which the number of the objects to be counted shown in the set other estimation area is estimatable is removed from the acquired area may be constituted by a set of rectangles indicating the objects to be counted.

(Supplementary Note 13)

The object counting program according to supplementary note 12 causes the computer to perform processing for setting an area constituted by a set of rectangles constituting the acquired area from which rectangles included in both sets of rectangles constituting the acquired area and of rectangles constituting another estimation area set in the area to an area in which the area in which the number of the objects to be counted indicated in the set other estimation area can be estimated is removed from the acquired area.

(Supplementary Note 14)

The object counting program according to any one of supplementary notes 11 to 13 causes the computer to perform processing for the estimation area such that the estimation area most extensively includes the area in which the area in which the number of the objects to be counted indicated in the set other estimation region can be estimated is removed from the acquired region.

(Supplementary Note 15)

The object counting program according to any one of supplementary notes 11 to 13 causes the computer to perform processing for setting the estimation area such that the estimation area satisfies a condition that the area in which the area in which the number of the objects to be counted indicated in the set other estimation area is estimatable is removed from the acquired area is most extensively included, and other conditions.

(Supplementary Note 16)

The object counting program according to any one of supplementary notes 10 to 15 causes the computer to perform processing for outputting information about the setting of the estimation area indicating the position, size, and shape of the estimation area, and the image corresponding to the estimation area set on the basis of the information.

(Supplementary Note 17)

An object counting program causes a computer to perform estimation processing for estimating, in each estimation area, the number of the objects to be counted shown in an estimation area set in an image where is a partial area of the image, and is a unit of area in which the number of the objects to be counted is estimated, and computation processing for computing a density of the objects to be counted in an area where predetermined areas in the estimation area are overlapped using the number of the objects to be counted that has been estimated in each estimation area.

(Supplementary Note 18)

The object counting program according to supplementary note 17 causes the computer to perform processing for computing the density of the objects to be counted in an area satisfying a predetermined condition in each estimation area using the number of the objects to be counted that has been estimated in each estimation area, and computing an average value of the computed densities as the density of the objects to be counted in the area where predetermined areas in the estimation area are overlapped.

The present invention has been described with reference to the exemplary embodiment and examples, but is not limited to the above exemplary embodiment and examples. Various changes that can be understood by those skilled in the art within the scope of the present invention can be made to the configuration and details of the present invention.

INDUSTRIAL APPLICABILITY

The present invention can be applied to an object counting device that can more accurately count objects in an image by appropriately arranging estimation windows and integrating the number of persons estimated in each estimation window, a program that causes a computer to implement the object counting device, and the like.

In addition, since the number of estimation windows is not too many but an appropriate number, the present invention can be suitably applied to an object counting device that operates at high speed while counting objects in an image more accurately, an object counting program that causes a computer to implement the object counting device, and the like.

The present invention can be also suitably applied to a device having one or more functions of recognizing suspicious persons, recognizing leaving of suspicious objects, recognizing tailgating, recognizing abnormal states, and recognizing abnormal behaviors in the field of monitoring in which estimation of the number of objects in images captured by a camera or stored images. Furthermore, the present invention can be suitably applied to a device having functions of behavior analysis and environmental condition analysis in the field of marketing.

The present invention can further be suitably applied to a device having an input interface that inputs an estimation result of the number of objects in images captured by a camera or stored images, the position of the estimated object in the two-dimensional space, or the position in three-dimensional space. Moreover, the present invention can be suitably applied to a video search device, in which an event is caused by input of an estimation result of the number of objects, the position of the estimated object in the two-dimensional space, or the position in the three-dimensional space.

REFERENCE SIGNS LIST 20, 30 Object counting device
21, 41 Acquisition means
22, 42 Setting means
31, 43 Estimation means
32, 44 Computation means
40, 100 Object counting system
200 Estimation window arrangement device
210, 320 Storage device
220, 330 Data processing device
211 Resolution map storage means
212 Estimation window information storage means
221 Estimation window size acquisition means
222 Countable region acquisition means
223 Estimation window arrangement means
230, 340 Computer
240, 350 Computer-readable storage medium
241, 351 Object counting program
300 Object-number integration device
310 Image acquisition device
321 Estimation window arrangement storage means
322 Estimating dictionary storage means
331 Object-number estimation means
332 Integration means

The invention claimed is:

1. An object counting device comprising:
a memory having stored therein computer readable instructions;
a processor configured to execute the computer readable instructions, that when executed comprise:
an estimation unit which estimates, in each respective estimation area, a number of objects to be counted that are contained within an estimation area set within an image which is a partial area of the image, and is a unit of area in which the number of the objects to be counted is estimated; and
a computation unit which computes a density of the objects to be counted in an area where predetermined areas in the estimation area are overlapped using the number of the objects to be counted that has been estimated in each respective estimation area.

2. The object counting device according to claim 1, wherein
the computation unit computes the density of the objects to be counted in an area satisfying a predetermined condition in each respective estimation area using the number of the objects to be counted that has been estimated in each respective estimation area, and computes an average value of the computed densities as the density of the objects to be counted in the area where predetermined areas in the estimation area are overlapped.

3. An object counting method comprising:
estimating, in each respective estimation area, a number of objects to be counted that are contained within an estimation area set within an image which is a partial area of the image and is a unit of area in which the number of the objects to be counted is estimated; and
computing a density of the objects to be counted in an area where predetermined areas in the estimation area are overlapped using the number of the objects to be counted that has been estimated in each respective estimation area.

4. A non-transitory computer-readable recording medium having recorded therein an object counting program that when executed by a computer cause the computer to perform:
estimation processing for estimating, in each respective estimation area, a number of objects to be counted that are contained within an estimation area set within an image which is a partial area of the image and is a unit of area in which the number of the objects to be counted is estimated; and
computation processing for computing a density of the objects to be counted in an area where predetermined areas in the estimation area are overlapped using the number of the objects to be counted that has been estimated in each respective estimation area.

5. The object counting device according to claim 1, wherein the processor, when executing the instructions, further comprises:
- an acquisition unit which acquires information of an estimation area which is a partial area of an image with which partial area a predetermined condition related to objects to be counted shown in the image are associated, the estimation area being a unit of area for estimating the number of the objects to be counted; and
- a setting unit which sets the estimation area in the image in such a manner that the estimation area indicated by the acquired information of the estimation area includes the objects to be counted which are not included in the objects to be counted in a different estimation area, and which satisfy the predetermined condition.

6. The object counting device according to claim 2, wherein the processor, when executing the instructions, further comprises:
- an acquisition unit which acquires information of an estimation area which is a partial area of an image with which partial area a predetermined condition related to objects to be counted shown in the image are associated, the estimation area being a unit of area for estimating the number of the objects to be counted; and
- a setting unit which sets the estimation area in the image in such a manner that the estimation area indicated by the acquired information of the estimation area includes the objects to be counted which are not included in the objects to be counted in a different estimation area, and which satisfy the predetermined condition.

7. The object counting device according to claim 5, wherein the processor, when executing the instructions, further comprises:
- an area acquisition unit which acquires an area showing the objects to be counted satisfying the predetermined condition associated with the estimation area in the image, wherein
- the setting unit sets the estimation area in an area in which an area in which the number of the objects to be counted shown in the other estimation area set in the area is estimatable is removed from the acquired area.

8. The object counting device according to claim 6, wherein the processor, when executing the instructions, further comprises:
- an area acquisition unit which acquires an area showing the objects to be counted satisfying the predetermined condition associated with the estimation area in the image, wherein
- the setting unit sets the estimation area in an area in which an area in which the number of the objects to be counted shown in the other estimation area set in the area is estimatable is removed from the acquired area.

* * * * *

UNITED STATES PATENT AND TRADEMARK OFFICE
CERTIFICATE OF CORRECTION

PATENT NO. : 10,559,091 B2  
APPLICATION NO. : 15/758964  
DATED : February 11, 2020  
INVENTOR(S) : Hiroo Ikeda Page 1 of 1

It is certified that error appears in the above-identified patent and that said Letters Patent is hereby corrected as shown below:

In the Claims

Column 28, Line 46; In Claim 3, after "image", insert --,--

Column 28, Line 60; In Claim 4, after "image", insert --,--

Signed and Sealed this
Fourteenth Day of July, 2020

Andrei Iancu
*Director of the United States Patent and Trademark Office*